(12) United States Patent
Felsinger et al.

(10) Patent No.: US 10,847,057 B2
(45) Date of Patent: Nov. 24, 2020

(54) SYNTHETIC TISSUE STRUCTURES FOR ELECTROSURGICAL TRAINING AND SIMULATION

(71) Applicant: Applied Medical Resources Corporation, Rancho Santa Margarita, CA (US)

(72) Inventors: Natasha Felsinger, Rancho Santa Margarita, CA (US); Milan Draganov, Rancho Santa Margarita, CA (US)

(73) Assignee: Applied Medical Resources Corporation, Rancho Santa Margarita, CA (US)

(*) Notice: Subject to any disclaimer, the term of this patent is extended or adjusted under 35 U.S.C. 154(b) by 353 days.

(21) Appl. No.: 15/902,108

(22) Filed: Feb. 22, 2018

(65) Prior Publication Data

US 2018/0240366 A1    Aug. 23, 2018

Related U.S. Application Data

(63) Continuation of application No. PCT/US2018/018895, filed on Feb. 21, 2018.

(Continued)

(51) Int. Cl.
*G09B 23/30* (2006.01)
(52) U.S. Cl.
CPC .................... *G09B 23/30* (2013.01)
(58) Field of Classification Search
USPC .......... 434/262, 267, 268, 272, 273
See application file for complete search history.

(56) References Cited

U.S. PATENT DOCUMENTS

| 184,573 A | 11/1876 | Becker |
|---|---|---|
| 2,127,774 A | 8/1938 | Jacobs |

(Continued)

FOREIGN PATENT DOCUMENTS

| CA | 2 293 585 A1 | 12/1998 |
|---|---|---|
| CN | 2421706 Y | 2/2001 |

(Continued)

OTHER PUBLICATIONS

European Patent Office, Extended European Search Report for European Patent Application No. EP 18184147.9, titled "First Entry Model," dated Nov. 7, 2018, 7 pgs.

(Continued)

*Primary Examiner* — Kurt Fernstrom
(74) *Attorney, Agent, or Firm* — Patrick Ikehara

(57) ABSTRACT

A simulated rectum model for training transanal minimally invasive surgery is provided. The model includes three substantially concentric layers, a first layer, a second layer and a third layer, made of electrically conductive hydrogel material sized and configured to simulate a mucosal layer, a muscle layer and a mesorectum layer, respectively. Each layer is made of a dual interpenetrating cross-linked network having a ratio of covalently cross-linked acrylamide to ionically cross-linked alginate. The ratio for each layer is selected for the desired adhesion properties between two adjacent layers. The model is capable of expanding in size when insufflated and simulating a billowing condition. When the model is dissected with electrosurgical instruments, the hydrogel material realistically emits vapor simulating smoke and causes char to build up on instruments. Artificial polyps and transverse folds are molded on the inner surface of the model.

20 Claims, 10 Drawing Sheets

Related U.S. Application Data

(60) Provisional application No. 62/462,701, filed on Feb. 23, 2017.

(56) References Cited

U.S. PATENT DOCUMENTS

| | | |
|---|---|---|
| 2,284,888 A | 6/1942 | Arneil, Jr. |
| 2,324,702 A | 7/1943 | Hoffman et al. |
| 2,345,489 A | 3/1944 | Lord |
| 2,495,568 A | 1/1950 | Coel |
| 3,766,666 A | 10/1973 | Stroop |
| 3,775,865 A | 12/1973 | Rowan |
| 3,789,518 A | 2/1974 | Chase |
| 3,921,311 A | 11/1975 | Beasley et al. |
| 3,991,490 A | 11/1976 | Markman |
| 4,001,951 A | 1/1977 | Fasse |
| 4,001,952 A | 1/1977 | Kleppinger |
| 4,321,047 A | 3/1982 | Landis |
| 4,323,350 A | 4/1982 | Bowden, Jr. |
| 4,332,569 A | 6/1982 | Burbank |
| 4,371,345 A | 2/1983 | Palmer et al. |
| 4,386,917 A | 6/1983 | Forrest |
| 4,459,113 A | 7/1984 | Boscaro Gatti et al. |
| 4,481,001 A | 11/1984 | Graham et al. |
| 4,596,528 A | 6/1986 | Lewis et al. |
| 4,726,772 A | 2/1988 | Amplatz |
| 4,737,109 A | 4/1988 | Abramson |
| 4,789,340 A | 12/1988 | Zikria |
| 4,832,978 A | 5/1989 | Lesser |
| 4,867,686 A | 9/1989 | Goldstein |
| 4,907,973 A | 3/1990 | Hon |
| 4,938,696 A | 7/1990 | Foster et al. |
| 4,940,412 A | 7/1990 | Blumenthal |
| 5,061,187 A | 10/1991 | Jerath |
| 5,083,962 A | 1/1992 | Pracas |
| 5,104,328 A | 4/1992 | Lounsbury |
| 5,149,270 A | 9/1992 | McKeown |
| 5,180,308 A | 1/1993 | Garito et al. |
| 5,230,630 A | 7/1993 | Burgett |
| 5,273,435 A | 12/1993 | Jacobson |
| 5,295,694 A | 3/1994 | Levin |
| 5,310,348 A | 5/1994 | Miller |
| 5,318,448 A | 6/1994 | Garito et al. |
| 5,320,537 A | 6/1994 | Watson |
| 5,358,408 A | 10/1994 | Medina |
| 5,368,487 A | 11/1994 | Medina |
| 5,380,207 A | 1/1995 | Siepser |
| 5,403,191 A | 4/1995 | Tuason |
| 5,425,644 A | 6/1995 | Szinicz |
| 5,425,731 A | 6/1995 | Daniel et al. |
| 5,472,345 A | 12/1995 | Eggert |
| 5,518,406 A | 5/1996 | Waters |
| 5,518,407 A | 5/1996 | Greenfield et al. |
| 5,520,633 A | 5/1996 | Costin |
| 5,541,304 A | 7/1996 | Thompson |
| 5,620,326 A | 4/1997 | Younker |
| 5,720,742 A | 2/1998 | Zacharias |
| 5,722,836 A | 3/1998 | Younker |
| 5,727,948 A | 3/1998 | Jordan |
| 5,743,730 A | 4/1998 | Clester et al. |
| 5,762,458 A | 6/1998 | Wang et al. |
| 5,769,640 A | 6/1998 | Jacobus et al. |
| 5,775,916 A | 7/1998 | Cooper et al. |
| 5,785,531 A | 7/1998 | Leung |
| 5,800,178 A | 9/1998 | Gillio |
| 5,803,746 A | 9/1998 | Barrie et al. |
| 5,807,378 A | 9/1998 | Jensen et al. |
| 5,810,880 A | 9/1998 | Jensen et al. |
| 5,814,038 A | 9/1998 | Jensen et al. |
| 5,850,033 A | 12/1998 | Mirzeabasov et al. |
| 5,855,583 A | 1/1999 | Wang et al. |
| 5,873,732 A | 2/1999 | Hasson |
| 5,873,863 A | 2/1999 | Komlosi |
| 5,908,302 A | 6/1999 | Goldfarb |
| 5,947,743 A | 9/1999 | Hasson |
| 5,951,301 A | 9/1999 | Younker |
| 6,080,181 A | 6/2000 | Jensen et al. |
| 6,083,008 A | 7/2000 | Yamada et al. |
| 6,113,395 A | 9/2000 | Hon |
| 6,234,804 B1 | 5/2001 | Yong |
| 6,271,278 B1 | 8/2001 | Park et al. |
| 6,336,812 B1 | 1/2002 | Cooper et al. |
| 6,398,557 B1 | 6/2002 | Hoballah |
| 6,413,264 B1 | 7/2002 | Jensen et al. |
| 6,474,993 B1 | 11/2002 | Grund et al. |
| 6,485,308 B1 | 11/2002 | Goldstein |
| 6,488,507 B1 | 12/2002 | Stoloff et al. |
| 6,497,902 B1 | 12/2002 | Ma |
| 6,511,325 B1 | 1/2003 | Lalka et al. |
| 6,517,354 B1 | 2/2003 | Levy |
| 6,568,941 B1 | 5/2003 | Goldstein |
| 6,589,057 B1 | 7/2003 | Keenan et al. |
| 6,620,174 B2 | 9/2003 | Jensen et al. |
| 6,654,000 B2 | 11/2003 | Rosenberg |
| 6,659,776 B1 | 12/2003 | Aumann et al. |
| 6,773,263 B2 | 8/2004 | Nicholls et al. |
| 6,780,016 B1 | 8/2004 | Toly |
| 6,817,973 B2 | 11/2004 | Merril et al. |
| 6,820,025 B2 | 11/2004 | Bachmann et al. |
| 6,854,976 B1 | 2/2005 | Suhr |
| 6,857,878 B1 | 2/2005 | Chosack et al. |
| 6,863,536 B1 | 3/2005 | Fisher et al. |
| 6,866,514 B2 | 3/2005 | Von Roeschlaub et al. |
| 6,887,082 B2 | 5/2005 | Shun |
| 6,929,481 B1 | 8/2005 | Alexander et al. |
| 6,939,138 B2 | 9/2005 | Chosack et al. |
| 6,950,025 B1 | 9/2005 | Nguyen |
| 6,960,617 B2 | 11/2005 | Omidian et al. |
| 6,997,719 B2 | 2/2006 | Wellman et al. |
| 7,008,232 B2 | 3/2006 | Brassel |
| 7,018,327 B1 | 3/2006 | Conti |
| 7,025,064 B2 | 4/2006 | Wang et al. |
| 7,056,123 B2 | 6/2006 | Gregorio et al. |
| 7,080,984 B1 | 7/2006 | Cohen |
| 7,118,582 B1 | 10/2006 | Wang et al. |
| 7,255,565 B2 | 8/2007 | Keegan |
| 7,269,532 B2 | 9/2007 | David et al. |
| 7,272,766 B2 | 9/2007 | Sakezles |
| 7,300,450 B2 | 11/2007 | Vleugels et al. |
| 7,364,582 B2 | 4/2008 | Lee |
| 7,404,716 B2 | 7/2008 | Gregorio et al. |
| 7,419,376 B2 | 9/2008 | Sarvazyan et al. |
| 7,427,199 B2 | 9/2008 | Sakezles |
| 7,431,189 B2 | 10/2008 | Shelton, IV et al. |
| 7,441,684 B2 | 10/2008 | Shelton, IV et al. |
| 7,465,168 B2 | 12/2008 | Allen et al. |
| 7,467,075 B2 | 12/2008 | Humphries et al. |
| 7,544,062 B1 | 6/2009 | Hauschild et al. |
| 7,549,866 B2 | 6/2009 | Cohen et al. |
| 7,553,159 B1 | 6/2009 | Arnal et al. |
| 7,575,434 B2 | 8/2009 | Palakodeti |
| 7,594,815 B2 | 9/2009 | Toly |
| 7,621,749 B2 | 11/2009 | Munday |
| 7,646,901 B2 | 1/2010 | Murphy et al. |
| 7,648,367 B1 | 1/2010 | Makower et al. |
| 7,648,513 B2 | 1/2010 | Green et al. |
| 7,651,332 B2 | 1/2010 | Dupuis et al. |
| 7,677,897 B2 | 3/2010 | Sakezles |
| 7,775,916 B1 | 8/2010 | Mahoney |
| 7,780,451 B2 | 8/2010 | Willobee et al. |
| 7,802,990 B2 | 9/2010 | Korndorffer et al. |
| 7,803,151 B2 | 9/2010 | Whitman |
| 7,806,696 B2 | 10/2010 | Alexander et al. |
| 7,819,799 B2 | 10/2010 | Merril et al. |
| 7,833,018 B2 | 11/2010 | Alexander et al. |
| 7,837,473 B2 | 11/2010 | Koh |
| 7,850,454 B2 | 12/2010 | Toly |
| 7,850,456 B2 | 12/2010 | Chosack et al. |
| 7,854,612 B2 | 12/2010 | Frassica et al. |
| 7,857,626 B2 | 12/2010 | Toly |
| 7,866,983 B2 | 1/2011 | Hemphill et al. |
| 7,931,470 B2 | 4/2011 | Alexander et al. |
| 7,931,471 B2 | 4/2011 | Senagore et al. |
| 7,988,992 B2 | 8/2011 | Omidian et al. |
| 7,993,140 B2 | 8/2011 | Sakezles |

(56) References Cited

U.S. PATENT DOCUMENTS

| | | |
|---|---|---|
| 7,997,903 B2 | 8/2011 | Hasson et al. |
| 8,007,281 B2 | 8/2011 | Toly |
| 8,007,282 B2 | 8/2011 | Gregorio et al. |
| 8,016,818 B2 | 9/2011 | Ellis et al. |
| 8,017,107 B2 | 9/2011 | Thomas et al. |
| 8,021,162 B2 | 9/2011 | Sui |
| 8,048,088 B2 | 11/2011 | Green et al. |
| 8,083,691 B2 | 12/2011 | Goldenberg et al. |
| 8,116,847 B2 | 2/2012 | Gattani et al. |
| 8,137,110 B2 | 3/2012 | Sakezles |
| 8,157,145 B2 | 4/2012 | Shelton, IV et al. |
| 8,197,464 B2 | 6/2012 | Krever et al. |
| 8,205,779 B2 | 6/2012 | Ma et al. |
| 8,221,129 B2 | 7/2012 | Parry et al. |
| 8,297,982 B2 | 10/2012 | Park et al. |
| 8,308,817 B2 | 11/2012 | Egilsson et al. |
| 8,323,028 B2 | 12/2012 | Matanhelia |
| 8,323,029 B2 | 12/2012 | Toly |
| 8,328,560 B2 | 12/2012 | Niblock et al. |
| 8,342,851 B1 | 1/2013 | Speeg et al. |
| 8,403,674 B2 | 3/2013 | Feygin et al. |
| 8,403,675 B2 | 3/2013 | Stoianovici et al. |
| 8,403,676 B2 | 3/2013 | Frassica et al. |
| 8,408,920 B2 | 4/2013 | Speller |
| 8,425,234 B2 | 4/2013 | Sakezles |
| 8,439,687 B1 | 5/2013 | Morriss et al. |
| 8,442,621 B2 | 5/2013 | Gorek et al. |
| 8,454,368 B2 | 6/2013 | Ault et al. |
| 8,459,094 B2 | 6/2013 | Yanni |
| 8,459,520 B2 | 6/2013 | Giordano et al. |
| 8,460,002 B2 | 6/2013 | Wang et al. |
| 8,465,771 B2 | 6/2013 | Wan et al. |
| 8,469,715 B2 | 6/2013 | Ambrozio |
| 8,469,716 B2 | 6/2013 | Fedotov et al. |
| 8,480,407 B2 * | 7/2013 | Campbell ............ G09B 23/28 434/272 |
| 8,480,408 B2 | 7/2013 | Ishii et al. |
| 8,491,309 B2 | 7/2013 | Parry et al. |
| 8,500,753 B2 | 8/2013 | Green et al. |
| 8,512,044 B2 | 8/2013 | Sakezles |
| 8,517,243 B2 | 8/2013 | Giordano et al. |
| 8,521,252 B2 | 8/2013 | Diez |
| 8,535,062 B2 | 9/2013 | Nguyen |
| 8,544,711 B2 | 10/2013 | Ma et al. |
| 8,556,635 B2 | 10/2013 | Toly |
| 8,608,483 B2 | 12/2013 | Trotta et al. |
| 8,613,621 B2 | 12/2013 | Henderickson et al. |
| 8,636,520 B2 | 1/2014 | Iwasaki et al. |
| D699,297 S | 2/2014 | Bahsoun et al. |
| 8,641,423 B2 | 2/2014 | Gumkowski |
| 8,647,125 B2 | 2/2014 | Johns et al. |
| 8,678,831 B2 | 3/2014 | Trotta et al. |
| 8,679,279 B2 | 3/2014 | Thompson et al. |
| 8,696,363 B2 | 4/2014 | Gray et al. |
| 8,708,213 B2 | 4/2014 | Shelton, IV et al. |
| 8,708,707 B2 | 4/2014 | Hendrickson et al. |
| 8,764,449 B2 | 7/2014 | Rios et al. |
| 8,764,452 B2 | 7/2014 | Pravong et al. |
| 8,800,839 B2 | 8/2014 | Beetel |
| 8,801,437 B2 | 8/2014 | Mousques |
| 8,801,438 B2 * | 8/2014 | Sakezles ............ G09B 23/34 434/274 |
| 8,807,414 B2 | 8/2014 | Ross et al. |
| 8,808,004 B2 | 8/2014 | Misawa et al. |
| 8,808,311 B2 | 8/2014 | Heinrich et al. |
| 8,814,573 B2 | 8/2014 | Nguyen |
| 8,827,988 B2 | 9/2014 | Belson et al. |
| 8,840,628 B2 | 9/2014 | Green et al. |
| 8,870,576 B2 * | 10/2014 | Millon ............ B29C 39/003 434/267 |
| 8,888,498 B2 | 11/2014 | Bisaillon et al. |
| 8,893,946 B2 | 11/2014 | Boudreaux et al. |
| 8,911,238 B2 | 12/2014 | Forsythe |
| 8,915,742 B2 | 12/2014 | Hendrickson et al. |
| 8,945,095 B2 | 2/2015 | Blumenkranz et al. |
| 8,961,190 B2 | 2/2015 | Hart et al. |
| 8,966,954 B2 | 3/2015 | Ni et al. |
| 8,968,003 B2 | 3/2015 | Hendrickson et al. |
| 9,008,989 B2 | 4/2015 | Wilson et al. |
| 9,017,080 B1 | 4/2015 | Placik |
| 9,026,247 B2 | 5/2015 | White |
| 9,050,201 B2 | 6/2015 | Egilsson et al. |
| 9,056,126 B2 | 6/2015 | Hersel et al. |
| 9,070,306 B2 | 6/2015 | Rappel et al. |
| 9,087,458 B2 | 7/2015 | Shim et al. |
| 9,096,744 B2 | 8/2015 | Wan et al. |
| 9,117,377 B2 | 8/2015 | Shim et al. |
| 9,119,572 B2 | 9/2015 | Gorek et al. |
| 9,123,261 B2 | 9/2015 | Lowe |
| 9,129,054 B2 | 9/2015 | Nawana et al. |
| 9,196,176 B2 | 11/2015 | Hager et al. |
| 9,226,799 B2 | 1/2016 | Lightcap et al. |
| 9,257,055 B2 | 2/2016 | Endo et al. |
| 9,265,587 B2 | 2/2016 | Vancamberg et al. |
| 9,295,468 B2 | 3/2016 | Heinrich et al. |
| 9,336,694 B2 | 5/2016 | Shim et al. |
| 9,351,714 B2 | 5/2016 | Ross et al. |
| 9,358,682 B2 | 6/2016 | Ruiz Morales |
| 9,364,224 B2 | 6/2016 | Nicholas et al. |
| 9,364,279 B2 | 6/2016 | Houser et al. |
| 9,370,361 B2 | 6/2016 | Viola et al. |
| 9,373,270 B2 | 6/2016 | Miyazaki |
| 9,387,276 B2 | 7/2016 | Sun et al. |
| 9,427,496 B2 | 8/2016 | Sun et al. |
| 9,439,649 B2 | 9/2016 | Shelton, IV et al. |
| 9,439,733 B2 | 9/2016 | Ha et al. |
| 9,449,532 B2 | 9/2016 | Black et al. |
| 9,468,438 B2 | 10/2016 | Baber et al. |
| 10,081,727 B2 * | 9/2018 | Felsinger ............ B29C 39/003 |
| 2001/0019818 A1 | 9/2001 | Yong |
| 2002/0168619 A1 | 11/2002 | Provenza |
| 2003/0031993 A1 | 2/2003 | Pugh |
| 2003/0091967 A1 | 5/2003 | Chosack et al. |
| 2003/0176770 A1 | 9/2003 | Merril et al. |
| 2004/0005423 A1 | 1/2004 | Dalton et al. |
| 2004/0126746 A1 | 7/2004 | Toly |
| 2004/0248072 A1 | 12/2004 | Gray et al. |
| 2005/0008997 A1 | 1/2005 | Herman |
| 2005/0026125 A1 | 2/2005 | Toly |
| 2005/0084833 A1 | 4/2005 | Lacey et al. |
| 2005/0131390 A1 | 6/2005 | Heinrich et al. |
| 2005/0142525 A1 | 6/2005 | Cotin et al. |
| 2005/0192595 A1 | 9/2005 | Green et al. |
| 2005/0196739 A1 | 9/2005 | Moriyama |
| 2005/0196740 A1 | 9/2005 | Moriyama |
| 2005/0214727 A1 | 9/2005 | Stoianovici et al. |
| 2006/0046235 A1 | 3/2006 | Alexander et al. |
| 2006/0252019 A1 | 11/2006 | Burkitt et al. |
| 2006/0275741 A1 | 12/2006 | Chewning et al. |
| 2007/0074584 A1 | 4/2007 | Talarico et al. |
| 2007/0077544 A1 | 4/2007 | Lemperle et al. |
| 2007/0078484 A1 | 4/2007 | Talarico et al. |
| 2007/0148626 A1 | 6/2007 | Ikeda |
| 2007/0166682 A1 | 7/2007 | Yarin et al. |
| 2007/0197895 A1 | 8/2007 | Nycz et al. |
| 2007/0225734 A1 | 9/2007 | Bell et al. |
| 2007/0275359 A1 | 11/2007 | Rotnes et al. |
| 2008/0032272 A1 | 2/2008 | Palakodeti |
| 2008/0032273 A1 | 2/2008 | Macnamara et al. |
| 2008/0052034 A1 | 2/2008 | David et al. |
| 2008/0064017 A1 | 3/2008 | Grundmeyer, III |
| 2008/0076101 A1 * | 3/2008 | Hyde ............ G09B 23/30 434/272 |
| 2008/0097501 A1 | 4/2008 | Blier |
| 2008/0108869 A1 | 5/2008 | Sanders et al. |
| 2008/0187895 A1 * | 8/2008 | Sakezles ............ G09B 23/306 434/268 |
| 2008/0188948 A1 | 8/2008 | Flatt |
| 2008/0293026 A1 * | 11/2008 | Senagore ............ G09B 23/285 434/262 |
| 2008/0299529 A1 | 12/2008 | Schaller |
| 2008/0317818 A1 | 12/2008 | Griffith et al. |
| 2009/0068627 A1 | 3/2009 | Toly |
| 2009/0142739 A1 | 6/2009 | Wang et al. |

(56) References Cited

U.S. PATENT DOCUMENTS

| | | |
|---|---|---|
| 2009/0142741 A1 | 6/2009 | Ault et al. |
| 2009/0143642 A1 | 6/2009 | Takahashi et al. |
| 2009/0176196 A1 | 7/2009 | Niblock et al. |
| 2009/0187079 A1 | 7/2009 | Albrecht et al. |
| 2009/0246747 A1 | 10/2009 | Buckman, Jr. |
| 2009/0298034 A1 | 12/2009 | Parry et al. |
| 2009/0314550 A1 | 12/2009 | Layton |
| 2010/0047752 A1 | 2/2010 | Chan et al. |
| 2010/0094312 A1 | 4/2010 | Ruiz Morales et al. |
| 2010/0099067 A1 | 4/2010 | Agro |
| 2010/0167248 A1 | 7/2010 | Ryan |
| 2010/0167249 A1 | 7/2010 | Ryan |
| 2010/0167250 A1 | 7/2010 | Ryan et al. |
| 2010/0167253 A1 | 7/2010 | Ryan et al. |
| 2010/0167254 A1 | 7/2010 | Nguyen |
| 2010/0196867 A1 | 8/2010 | Geerligs et al. |
| 2010/0204713 A1 | 8/2010 | Ruiz Morales |
| 2010/0209899 A1 | 8/2010 | Park et al. |
| 2010/0248200 A1 | 9/2010 | Ladak |
| 2010/0258611 A1 | 10/2010 | Smith et al. |
| 2010/0273136 A1 | 10/2010 | Kandasami et al. |
| 2010/0279263 A1 | 11/2010 | Duryea |
| 2010/0285094 A1 | 11/2010 | Gupta |
| 2010/0324541 A1 | 12/2010 | Whitman |
| 2011/0020779 A1 | 1/2011 | Hannaford et al. |
| 2011/0046637 A1 | 2/2011 | Patel et al. |
| 2011/0046659 A1 | 2/2011 | Ramstein et al. |
| 2011/0087238 A1 | 4/2011 | Wang et al. |
| 2011/0091855 A1 | 4/2011 | Miyazaki |
| 2011/0137337 A1 | 6/2011 | van den Dool et al. |
| 2011/0200976 A1 | 8/2011 | Hou et al. |
| 2011/0207104 A1 | 8/2011 | Trotta |
| 2011/0218550 A1 | 9/2011 | Ma |
| 2011/0244436 A1 | 10/2011 | Campo |
| 2011/0269109 A2 | 11/2011 | Miyazaki |
| 2011/0281251 A1 | 11/2011 | Mousques |
| 2011/0301620 A1 | 12/2011 | Di Betta et al. |
| 2012/0015337 A1 | 1/2012 | Hendrickson et al. |
| 2012/0015339 A1 | 1/2012 | Hendrickson et al. |
| 2012/0016362 A1 | 1/2012 | Heinrich et al. |
| 2012/0028231 A1 | 2/2012 | Misawa et al. |
| 2012/0045743 A1 | 2/2012 | Okano et al. |
| 2012/0065632 A1 | 3/2012 | Shadduck |
| 2012/0082970 A1 | 4/2012 | Pravong et al. |
| 2012/0100217 A1 | 4/2012 | Green et al. |
| 2012/0115117 A1 | 5/2012 | Marshall |
| 2012/0115118 A1 | 5/2012 | Marshall |
| 2012/0116391 A1 | 5/2012 | Houser et al. |
| 2012/0148994 A1 | 6/2012 | Hori et al. |
| 2012/0164616 A1 | 6/2012 | Endo et al. |
| 2012/0165866 A1 | 6/2012 | Kaiser et al. |
| 2012/0172873 A1 | 7/2012 | Artale et al. |
| 2012/0179072 A1 | 7/2012 | Kegreiss |
| 2012/0202180 A1 | 8/2012 | Stock et al. |
| 2012/0264096 A1 | 10/2012 | Taylor et al. |
| 2012/0264097 A1 | 10/2012 | Newcott et al. |
| 2012/0282583 A1 | 11/2012 | Thaler et al. |
| 2012/0282584 A1 | 11/2012 | Millon et al. |
| 2012/0283707 A1 | 11/2012 | Giordano et al. |
| 2012/0288839 A1 | 11/2012 | Crabtree |
| 2012/0308977 A1 | 12/2012 | Tortola |
| 2013/0087597 A1 | 4/2013 | Shelton, IV et al. |
| 2013/0101973 A1 | 4/2013 | Hoke et al. |
| 2013/0105552 A1 | 5/2013 | Weir et al. |
| 2013/0116668 A1 | 5/2013 | Shelton, IV et al. |
| 2013/0157240 A1 | 6/2013 | Hart et al. |
| 2013/0171288 A1 | 7/2013 | Harders |
| 2013/0177890 A1 | 7/2013 | Sakezles |
| 2013/0192741 A1 | 8/2013 | Trotta et al. |
| 2013/0218166 A1 | 8/2013 | Elmore |
| 2013/0224709 A1 | 8/2013 | Riojas et al. |
| 2013/0245681 A1 | 9/2013 | Straehnz et al. |
| 2013/0253480 A1 | 9/2013 | Kimball et al. |
| 2013/0267876 A1 | 10/2013 | Leckenby et al. |
| 2013/0282038 A1 | 10/2013 | Dannaher et al. |
| 2013/0288216 A1 | 10/2013 | Parry, Jr. et al. |
| 2013/0302771 A1 | 11/2013 | Alderete |
| 2013/0324991 A1 | 12/2013 | Clem et al. |
| 2013/0324999 A1 | 12/2013 | Price et al. |
| 2014/0011172 A1 | 1/2014 | Lowe |
| 2014/0017651 A1 | 1/2014 | Sugimoto et al. |
| 2014/0030682 A1 | 1/2014 | Thilenius |
| 2014/0038151 A1 | 2/2014 | Hart |
| 2014/0051049 A1 | 2/2014 | Jarc et al. |
| 2014/0072941 A1 | 3/2014 | Hendrickson et al. |
| 2014/0087345 A1 | 3/2014 | Breslin et al. |
| 2014/0087346 A1 | 3/2014 | Breslin et al. |
| 2014/0087347 A1 | 3/2014 | Tracy et al. |
| 2014/0087348 A1 | 3/2014 | Tracy et al. |
| 2014/0088413 A1 | 3/2014 | Von Bucsh et al. |
| 2014/0093852 A1 | 4/2014 | Poulsen et al. |
| 2014/0093854 A1 | 4/2014 | Poulsen et al. |
| 2014/0099858 A1 | 4/2014 | Hernandez |
| 2014/0106328 A1 | 4/2014 | Loor |
| 2014/0107471 A1 | 4/2014 | Haider et al. |
| 2014/0156002 A1 | 6/2014 | Thompson et al. |
| 2014/0162016 A1 | 6/2014 | Matsui et al. |
| 2014/0170623 A1 | 6/2014 | Jarstad et al. |
| 2014/0186809 A1 | 7/2014 | Hendrickson et al. |
| 2014/0187855 A1 | 7/2014 | Nagale et al. |
| 2014/0200561 A1 | 7/2014 | Ingmanson et al. |
| 2014/0212861 A1 | 7/2014 | Romano |
| 2014/0220527 A1 | 8/2014 | Li et al. |
| 2014/0220530 A1 | 8/2014 | Merkle et al. |
| 2014/0220532 A1 | 8/2014 | Ghez et al. |
| 2014/0242564 A1 | 8/2014 | Pravong et al. |
| 2014/0246479 A1 | 9/2014 | Baber et al. |
| 2014/0248596 A1 | 9/2014 | Hart et al. |
| 2014/0263538 A1 | 9/2014 | Leimbach et al. |
| 2014/0272878 A1 | 9/2014 | Shim et al. |
| 2014/0272879 A1 | 9/2014 | Shim et al. |
| 2014/0275795 A1 | 9/2014 | Little et al. |
| 2014/0275981 A1 | 9/2014 | Selover et al. |
| 2014/0277017 A1 | 9/2014 | Leimbach et al. |
| 2014/0303643 A1 | 10/2014 | Ha et al. |
| 2014/0303646 A1 | 10/2014 | Morgan et al. |
| 2014/0303660 A1 | 10/2014 | Boyden et al. |
| 2014/0308643 A1 | 10/2014 | Trotta et al. |
| 2014/0342334 A1 | 11/2014 | Black et al. |
| 2014/0349266 A1 | 11/2014 | Choi |
| 2014/0350530 A1 | 11/2014 | Ross et al. |
| 2014/0357977 A1 | 12/2014 | Zhou |
| 2014/0370477 A1 | 12/2014 | Black et al. |
| 2014/0371761 A1 | 12/2014 | Juanpera |
| 2014/0378995 A1 | 12/2014 | Kumar et al. |
| 2015/0031008 A1 | 1/2015 | Black et al. |
| 2015/0037773 A1 | 2/2015 | Quirarte Catano |
| 2015/0038613 A1 | 2/2015 | Sun et al. |
| 2015/0076207 A1 | 3/2015 | Boudreaux et al. |
| 2015/0086955 A1 | 3/2015 | Poniatowski et al. |
| 2015/0132732 A1 | 5/2015 | Hart et al. |
| 2015/0132733 A1 | 5/2015 | Garvik et al. |
| 2015/0135832 A1 | 5/2015 | Blumenkranz et al. |
| 2015/0148660 A1 | 5/2015 | Weiss et al. |
| 2015/0164598 A1 | 6/2015 | Blumenkranz et al. |
| 2015/0187229 A1 | 7/2015 | Wachli et al. |
| 2015/0194075 A1 | 7/2015 | Rappel et al. |
| 2015/0202299 A1 | 7/2015 | Burdick et al. |
| 2015/0209035 A1 | 7/2015 | Zemlock |
| 2015/0209059 A1 | 7/2015 | Trees et al. |
| 2015/0209573 A1 | 7/2015 | Hibner et al. |
| 2015/0228206 A1 | 8/2015 | Shim et al. |
| 2015/0262511 A1 | 9/2015 | Lin et al. |
| 2015/0265431 A1 | 9/2015 | Egilsson et al. |
| 2015/0272571 A1 | 10/2015 | Leimbach et al. |
| 2015/0272574 A1 | 10/2015 | Leimbach et al. |
| 2015/0272580 A1 | 10/2015 | Leimbach et al. |
| 2015/0272581 A1 | 10/2015 | Leimbach et al. |
| 2015/0272583 A1 | 10/2015 | Leimbach et al. |
| 2015/0272604 A1 | 10/2015 | Chowaniec et al. |
| 2015/0332609 A1 | 11/2015 | Alexander |
| 2015/0358426 A1 | 12/2015 | Kimball et al. |
| 2015/0371560 A1 | 12/2015 | Lowe |
| 2015/0374378 A1 | 12/2015 | Giordano et al. |

(56) References Cited

U.S. PATENT DOCUMENTS

| | | |
|---|---|---|
| 2015/0374449 A1 | 12/2015 | Chowaniec et al. |
| 2016/0000437 A1 | 1/2016 | Giordano et al. |
| 2016/0022374 A1 | 1/2016 | Haider et al. |
| 2016/0030240 A1 | 2/2016 | Gonenc et al. |
| 2016/0031091 A1 | 2/2016 | Popovic et al. |
| 2016/0058534 A1 | 3/2016 | Derwin et al. |
| 2016/0066909 A1 | 3/2016 | Baber et al. |
| 2016/0070436 A1 | 3/2016 | Thomas et al. |
| 2016/0073928 A1 | 3/2016 | Soper et al. |
| 2016/0074103 A1 | 3/2016 | Sartor |
| 2016/0098933 A1 | 4/2016 | Reiley et al. |
| 2016/0104394 A1 | 4/2016 | Miyazaki |
| 2016/0117956 A1 | 4/2016 | Larsson et al. |
| 2016/0125762 A1 | 5/2016 | Becker et al. |
| 2016/0133158 A1 | 5/2016 | Sui et al. |
| 2016/0140876 A1 | 5/2016 | Jabbour et al. |
| 2016/0194378 A1 | 7/2016 | Cass et al. |
| 2016/0199059 A1 | 7/2016 | Shelton, IV et al. |
| 2016/0220150 A1 | 8/2016 | Sharonov |
| 2016/0220314 A1 | 8/2016 | Huelman et al. |
| 2016/0225288 A1 | 8/2016 | East et al. |
| 2016/0232819 A1 | 8/2016 | Hofstetter et al. |
| 2016/0235494 A1 | 8/2016 | Shelton, IV et al. |
| 2016/0256187 A1 | 9/2016 | Shelton, IV et al. |
| 2016/0256229 A1 | 9/2016 | Morgan et al. |
| 2016/0262736 A1 | 9/2016 | Ross et al. |
| 2016/0262745 A1 | 9/2016 | Morgan et al. |
| 2016/0293055 A1 | 10/2016 | Hofstetter |
| 2016/0296144 A1 | 10/2016 | Gaddam et al. |

FOREIGN PATENT DOCUMENTS

| | | |
|---|---|---|
| CN | 2751372 Y | 1/2006 |
| CN | 2909427 Y | 6/2007 |
| CN | 101313842 A | 12/2008 |
| CN | 101528780 A | 9/2009 |
| CN | 201364679 Y | 12/2009 |
| CN | 201955979 U | 8/2011 |
| CN | 102458496 A | 5/2012 |
| CN | 202443680 U | 9/2012 |
| CN | 202563792 U | 11/2012 |
| CN | 202601055 U | 12/2012 |
| CN | 202694651 U | 1/2013 |
| CN | 103050040 A | 4/2013 |
| CN | 203013103 U | 6/2013 |
| CN | 203038549 U | 7/2013 |
| CN | 203338651 U | 12/2013 |
| CN | 203397593 U | 1/2014 |
| CN | 203562128 U | 4/2014 |
| CN | 102596275 B | 6/2014 |
| CN | 103845757 A | 6/2014 |
| CN | 103886797 A | 6/2014 |
| CN | 103396562 B | 7/2015 |
| CN | 105194740 A | 12/2015 |
| CN | 105504166 A | 4/2016 |
| DE | 9102218 U1 | 5/1991 |
| DE | 41 05 892 A1 | 8/1992 |
| DE | 44 14 832 A1 | 11/1995 |
| DE | 19716341 A1 | 9/2000 |
| EP | 1 024 173 A1 | 8/2000 |
| EP | 2 218 570 A1 | 8/2010 |
| FR | 2 691 826 A1 | 12/1993 |
| FR | 2 917 876 A1 | 12/2008 |
| GB | 2488994 A | 9/2012 |
| JP | 10 211160 A | 8/1998 |
| JP | 2001005378 A | 1/2001 |
| JP | 2009236963 A | 10/2009 |
| JP | 3162161 U | 8/2010 |
| JP | 2011113056 A | 6/2011 |
| JP | 2013127496 A | 6/2013 |
| KR | 101231565 B1 | 2/2013 |
| MX | PA 02004422 A | 11/2003 |
| PT | 106230 | 9/2013 |
| WO | WO 1994/06109 A1 | 3/1994 |
| WO | WO 1996/042076 A1 | 12/1996 |
| WO | WO 1998/58358 A1 | 12/1998 |
| WO | WO 1999/01074 A1 | 1/1999 |
| WO | WO 2000/36577 A1 | 6/2000 |
| WO | WO 2002/38039 A2 | 5/2002 |
| WO | WO 2002/038039 A3 | 5/2002 |
| WO | WO 2004/032095 A1 | 4/2004 |
| WO | WO 2004/082486 A1 | 9/2004 |
| WO | WO 2005/071639 A1 | 8/2005 |
| WO | WO 2006/083963 A2 | 8/2006 |
| WO | WO 2007/068360 A1 | 6/2007 |
| WO | WO 2008/021720 A2 | 2/2008 |
| WO | WO 2008/103383 A1 | 8/2008 |
| WO | WO 2009/000939 A1 | 12/2008 |
| WO | WO 2009/089614 A1 | 7/2009 |
| WO | WO 2010/094730 A1 | 8/2010 |
| WO | WO 2011/035410 A1 | 3/2011 |
| WO | WO 2011/046606 A1 | 4/2011 |
| WO | WO 2011/127379 A2 | 10/2011 |
| WO | WO 2011/151304 A1 | 12/2011 |
| WO | WO 2012/149606 A1 | 11/2012 |
| WO | WO 2012/168287 A1 | 12/2012 |
| WO | WO 2012/175993 A1 | 12/2012 |
| WO | WO 2013/048978 A1 | 4/2013 |
| WO | WO 2013/103956 A1 | 7/2013 |
| WO | WO 2014/022815 A1 | 2/2014 |
| WO | WO 2014/093669 A1 | 6/2014 |
| WO | WO 2014/197793 A1 | 12/2014 |
| WO | WO 2015/148817 A1 | 10/2015 |
| WO | WO 2016/138528 A1 | 9/2016 |
| WO | WO 2016/183412 A1 | 11/2016 |
| WO | WO 2016/198238 A1 | 12/2016 |
| WO | WO 2016/201085 A1 | 12/2016 |
| WO | WO 2017/031214 A1 | 2/2017 |
| WO | WO 2017/042301 A1 | 3/2017 |

OTHER PUBLICATIONS

Society of Laparoendoscopic Surgeons, "Future Technology Session: The Edge of Innovation in Surgery, Space, and Business," http://www.laparoscopytoday.com/endourology/page/2/, Figure 1 B: http://laparoscopy.blogs.com/laparoscopy_today/images/6-1/6-1VlaovicPicB.jpg , Sep. 5-8, 2007, 10 pgs.

European Patent Office, International Search Report for International Application No. PCT/US2011/053859 A3, dated Apr. 5, 2012, entitled "Portable Laparoscopic Trainer," 8 pgs.

European Patent Office, The International Search Report and Written Opinion for International Application No. PCT/US2012/60997, entitled "Simulated Tissue Structure for Surgical Training," dated Mar. 7, 2013, 8 pgs.

European Patent Office, The International Search Report and Written Opinion for International Application No. PCT/US2012/070971, entitled "Advanced Surgical Simulation," dated Mar. 18, 2013, 10 pgs.

Human Patient Simulator, Medical Education Technologies, Inc., http://www.meti.com (1999) all, printed Apr. 12, 2013, 24 pgs.

The International Bureau of WIPO, International Preliminary Report on Patentability and Written Opinion for International Application No. PCT/US2011/053859, entitled "Portable Laparoscopic Trainer," dated Apr. 2, 2013, 9 pgs.

European Patent Office, The International Search Report and Written Opinion for International Application No. PCT/US2013/062363, entitled "Surgical Training Model for Laparoscopic Procedures," dated Jan. 22, 2014, 11 pgs.

European Patent Office, The International Search Report and Written Opinion for International Application No. PCT/US2013/061949, entitled "Surgical Training Model for Laparoscopic Procedures," dated Feb. 17, 2014, 7 pgs.

Anonymous: Realsim Systems—LTS2000, Sep. 4, 2005, pp. 1-2, XP055096193, Retrieved from the Internet: URL:https://web.archive.org/web/2005090403;3030/http://www.realsimsystems.com/exersizes.htm (retrieved on Jan. 14, 2014).

European Patent Office, The International Search Report and Written Opinion for International Application No. PCT/US2013/062269, entitled "Surgical Training Model for Transluminal Procedures," dated Feb. 17, 2014, 8 pgs.

(56) References Cited

OTHER PUBLICATIONS

European Patent Office, The International Search Report and Written Opinion for International Application No. PCT/US2013/061557, entitled "Surgical Training Model for Laparoscopic Procedures," dated Feb. 10, 2014, 9 pgs.
European Patent Office, The International Search Report and Written Opinion for International Application No. PCT/US2013/061728, entitled "Surgical Training Model for Laparoscopic Procedures," dated Oct. 18, 2013, 9 pgs.
Limps and Things, EP Guildford MATTU Hernia Trainer, http://limbsandthings.com/us/products/tep-guildford-mattu-hernia-trainer/, printed May 29, 2014, 11 pgs.
Simulab, Hernia Model, http://www.simulab.com/product/surgery/open/hernia model, printed printed May 29, 2014, 4 pgs.
McGill Laparoscopic Inguinal Hernia Simulator, Novel Low-Cost Simulator for Laparoscopic Inguinal Hernia Repair, Feb. 8, 2011, 1 pg.
University of Wisconsin-Madison Biomedical Engineering, Inguinal Hernia Model, http://bmedesign.engr.wisc.edu/projects/s10/hernia_model/, printed May 29, 2014, 62 pgs.
The International Bureau of WIPO, International Preliminary Report on Patentability for International Application No. PCT/US2012/070971, entitled "Advanced Surgical Simulation," dated Jun. 24, 2014, 7 pgs.
European Patent Office, The International Search Report and Written Opinion of the International Searching Authority for International Application No. PCT/US2014/038195, entitled "Hernia Model", dated Oct. 15, 2014, 20 pgs.
European Patent Office, The International Search Report and Written Opinion of the International Searching Authority for International Application No. PCT/US2014/048027, entitled "First Entry Model", dated Oct. 17, 2014, 10 pgs.
The International Bureau of WIPO, International Preliminary Report on Patentability for International Application No. PCT/US2012/060997, entitled "Simulated Tissue Structure for Surgical Training" dated Apr. 22, 2014, 6 pgs.
European Patent Office, The International Search Report and Written Opinion for International Application No. PCT/US2014/019840, entitled "Advanced Surgical Simulation Constructions and Methods," dated Jul. 4, 2014, 8 pgs.
Kurashima, et al, "A tool for training and evaluation of Laparoscopic inguinal hernia repair; the Global Operative Assessment of Laparoscopic Skills—Groin Hernia" American Journal of Surgery, Paul Hoeber, New York, NY, US vol. 201, No. 1, Jan. 1, 2011, pp. 54-61 XP027558745.
European Patent Office, The International Search Report and Written Opinion for International Application No. PCT/US2014/042998, entitled "Gallbladder Model," dated Jan. 7, 2015, 20 pgs.
The International Bureau of WIPO, International Preliminary Report on Patentability, for PCT application No. PCT/US2013/053497, entitled Simulated Stapling and Energy Based Ligation for Surgical Training, dated Feb. 12, 2015, 6 pgs.
The International Bureau of WIPO, International Preliminary Report on Patentability for International Application No. PCT/US2013/062363, entitled "Surgical Training Model for Laparoscopic Procedures," dated Apr. 9, 2015, 9 pgs.
The International Bureau of WIPO, International Preliminary Report on Patentability for International Application No. PCT/US2013/062269, entitled "Surgical Training Model for Laparoscopic Procedures," dated Apr. 9, 2015, 6 pgs.
The International Bureau of WIPO, International Preliminary Report on Patentability for International Application No. PCT/US2013/061557, entitled "Surgical Training Model for Laparoscopic Procedures," dated Apr. 9, 2015, 6 pgs.
The International Bureau of WIPO, International Preliminary Report on Patentability for International Application No. PCT/US2013/061728, entitled "Surgical Training Model for Laparoscopic Procedures," dated Apr. 9, 2015, 7 pgs.
The International Bureau of WIPO, International Preliminary Report on Patentability for International Application No. PCT/US2013/061949, entitled "Surgical Training Model for Laparoscopic Procedures," dated Apr. 9, 2015, 6 pgs.
The International Bureau of WIPO, International Preliminary Report on Patentability for International Application No. PCT/US2014/019840, entitled "Simulated Tissue Structure for Surgical Training," dated Sep. 11, 2015, 8 pgs.
European Patent Office, The International Search Report and Written Opinion for International Application No. PCT/US2015/020574, entitled "Advanced First Entry Model for Surgical Simulation," dated Jun. 1, 2015, 12 pgs.
European Patent Office, The International Search Report and Written Opinion for International Application No. PCT/US2015/022774, entitled "Simulated Dissectible Tissue," dated Jun. 11, 2015, 13 pgs.
Anonymous: Silicone rubber-from Wikipedia, the free encyclopedia, pp. 1-6, XP055192375, Retrieved from the Internet: URL:http://en.wikipedia.org/w.index.php?title=Silicone_rubber&oldid=596456058 (retrieved on May 29, 2015).
Lamouche, et al., "Review of tissue simulating phantoms with controllable optical, mechanical and structural properties for use in optical coherence tomography," Biomedical Optics Express, Jun. 1, 2012, 18 pgs., vol. 3, No. 6.
The International Bureau of WIPO, International Preliminary Report on Patentability for International Application No. PCT/US2014/038195, entitled "Hernia Model," dated Nov. 26, 2015, 16 pgs.
The International Bureau of WIPO, International Preliminary Report on Patentability for International Application No. PCT/US2014/042998, entitled "Gallbladder Model," dated Dec. 30, 2015, 15 pgs.
European Patent Office, International Search Report and Written Opinion for International Application No. PCT/US2013/053497, titled "Simulated Stapling and Energy Based Ligation for Surgical Training," dated Nov. 5, 2013, 8 pgs.
The International Bureau of WIPO, International Preliminary Report on Patentability for International Application No. PCT/US2014/048027, entitled "First Entry Model," dated Feb. 4, 2016, 8 pgs.
European Patent Office, International Search Report and Written Opinion for International Application No. PCT/US2015/059668, entitled "Simulated Tissue Models and Methods," dated Apr. 26, 2016, 20 pgs.
Australian Patent Office, Patent Examination Report No. 1 for Australian Application No. 2012358851, titled "Advanced Surgical Simulation," dated May 26, 2016, 3 pgs.
Miyazaki Enterprises, "Miya Model Pelvic Surgery Training Model and Video," www.miyazakienterprises, printed Jul. 1, 2016, 1 pg.
European Patent Office, International Search Report and Written Opinion for International Application No. PCT/US2016/032292, entitled "Synthetic Tissue Structures for Electrosurgical Training and Simulation," dated Jul. 14, 2016, 11 pgs.
European Patent Office, International Search Report and Written Opinion for International Application No. PCT/US2016/018697, entitled "Simulated Tissue Structures and Methods," dated Jul. 14, 2016, 21 pgs.
European Patent Office, International Search Report and Written Opinion for International Application No. PCT/US2016/034591, entitled "Surgical Training Model for Laparoscopic Procedures," dated Aug. 8, 2016, 18 pgs.
European Patent Office, The International Search Report and Written Opinion of the International Searching Authority for International Application No. PCT/US2016/036664, entitled "Hysterectomy Model", dated Aug. 19, 2016, 15 pgs.
The International Bureau of WIPO, International Preliminary Report on Patentability for International Application No. PCT/US2015/020574, entitled "Advanced First Entry Model for Surgical Simulation," dated Sep. 22, 2016, 9 pgs.
European Patent Office, The International Search Report and Written Opinion of the International Searching Authority for International Application No. PCT/US2016/0043277 titled "Appendectomy Model", dated Oct. 4, 2016, 12 pgs.
The International Bureau of WIPO, International Preliminary Report on Patentability for International Application No. PCT/US2015/022774, titled "Simulated Dissectible Tissue," dated Oct. 6, 2016, 9 pgs.

(56) References Cited

OTHER PUBLICATIONS

European Patent Office, The International Search Report and Written Opinion of the International Searching Authority for International Application No. PCT/US2016/041852 titled "Simulated Dissectible Tissue", dated Oct. 13, 2016, 12 pgs.
European Patent Office, Invitation to Pay Additional Fees for International Application No. PCT/US2016/062669, titled "Simulated Dissectible Tissue", dated Feb. 10, 2017, 8 pgs.
European Patent Office, The International Search Report and Written Opinion of the International Searching Authority for International Application No. PCT/US2016/055148 titled "Hysterectomy Model", dated Feb. 28, 2017, 12 pgs.
European Patent Office, The International Search Report and Written Opinion of the International Searching Authority for International Application No. PCT/US2016/062669 titled "Simulated Dissectible Tissue", dated Apr. 5, 2017, 19 pgs.
European Patent Office, Examination Report for European Application No. 14733949.3 titled "Gallbladder Model," dated Dec. 21, 2016, 6 pgs.
European Patent Office, The International Search Report and Written Opinion of the International Searching Authority for International Application No. PCT/US2017/020389 titled "Simulated Tissue Cartridge", dated May 24, 2017, 13 pgs.
The International Bureau of WIPO, International Preliminary Report on Patentability for International Application No. PCT/US2015/059668, entitled "Simulated Tissue Models and Methods," dated May 26, 2017, 16 pgs.
The International Bureau of WIPO, International Preliminary Report on Patentability for International Application No. PCT/US2016/018697, entitled "Simulated Tissue Structures and Methods," dated Aug. 31, 2017, 14 pgs.
The International Bureau of WIPO, International Preliminary Report on Patentability for International Application No. PCT/US2016/0032292, entitled "Synthetic Tissue Structures for Electrosurgical Training and Simulation," dated Nov. 23, 2017, 8 pgs.
The International Bureau of WIPO, International Preliminary Report on Patentability for International Application No. PCT/US2016/034591, entitled "Surgical Training Model for Laparoscopic Procedures," dated Dec. 7, 2017, 14 pgs.
The International Bureau of WIPO, International Preliminary Report on Patentability for International Application No. PCT/US2016/036664, entitled "Hysterectomy Model," dated Dec. 21, 2017, 10 pgs.
The International Bureau of WIPO, International Preliminary Report on Patentability for International Application No. PCT/US2016/041852, entitled "Simulated Dissectible Tissue," dated Jan. 25, 2018, 12 pgs.
European Patent Office, Extended European Search Report for European Patent Application No. EP 17202365.7, titled "Gallbladder Model", dated Jan. 31, 2018, 8 pgs.
The International Bureau of WIPO, International Preliminary Report on Patentability for International Application No. PCT/US2016/043277, entitled "Appendectomy Model," dated Feb. 1, 2018, 9 pgs.
3D-MED Corporation, "Validated Training Course for Laparoscopic Skills", https://www.3-dmed.com/sites/default/files/product-additional/product-spec/Validated%20Training%20Course%20for%20Laparoscopic%20Skills.docx_3.pdf, printed Aug. 23, 2016, pp. 1-6.
3D-MED Corporation, "Loops and Wire #1," https://www.3-dmed.com/product/loops-and-wire-1, printed Aug. 23, 2016, 4 pgs.
Barrier, et al., "A Novel and Inexpensive Vaginal Hysterectomy Simulatory, "Simulation in Healthcare: The Journal of the Society for Simulation in Healthcare, vol. 7, No. 6, Dec. 1, 2012, pp. 374-379.
European Patent Office, The International Search Report and Written Opinion for International Application No. PCT/US2018/018036, entitled "Laparoscopic Training System," dated Jun. 8, 2018, 13 pgs.
The International Bureau of WIPO, International Preliminary Report on Patentability for International Application No. PCT/US2016/055148, entitled "Hysterectomy Model," dated Apr. 12, 2018, 12 pgs.
European Patent Office, The International Search Report and Written Opinion for International Application No. PCT/US2017/039113, entitled "Simulated Abdominal Wall," dated Aug. 7, 2017, 13 pgs.
European Patent Office, Extended European Search Report for European Patent Application No. EP 18177751.7, titled "Portable Laparoscopic Trainer," dated Jul. 13, 2018, 8 pgs.
European Patent Office, The International Search Report and Written Opinion for International Application No. PCT/US2018/034705, entitled "Laparoscopic Training System," dated Aug. 20, 2018, 14 pgs.
The International Bureau of WIPO, International Preliminary Report on Patentability for International Application No. PCT/US2017/020389, entitled "Simulated Tissue Cartridge," dated Sep. 13, 2018, 8 pgs.
European Patent Office, The International Search Report and Written Opinion for International Application No. PCT/US2018/018895, entitled "Synthetic Tissue Structures for Electrosurgical Training and Simulation," dated May 17, 2018, 12 pgs.
The International Bureau of WIPO, International Preliminary Report on Patentability for International Application No. PCT/US2016/062669, entitled "Simulated Dissectible Tissue," dated May 31, 2018, 11 pgs.
The International Bureau of WIPO, International Preliminary Report on Patentability for International Application No. PCT/US2017/039113, entitled "Simulated Abdominal Wall," dated Jan. 10, 2019, 8 pgs.
European Patent Office, Extended European Search Report for European Patent Application No. EP 18210006.5, titled "Surgical Training Model for Laparoscopic Procedures," dated Jan. 21, 2019, 7 pgs.
European Patent Office, Extended European Search Report for European Patent Application No. EP 18207214.0, titled "Synthetic Tissue Structures for Electrosurgical Training and Simulation," dated Mar. 28, 2019, 6 pgs.
European Patent Office, Extended European Search Report for European Patent Application No. EP 18216002.8, titled "Surgical Training Model for Laparoscopic Procedures," dated Feb. 4, 2019, 6 pgs.
European Patent Office, Extended European Search Report for European Patent Application No. EP 18216005.1, titled "Surgical Training Model for Laparoscopic Procedures," dated Feb. 4, 2019, 7 pgs.
European Patent Office, Extended European Search Report for European Patent Application No. EP 19159065.2, titled "Simulated Tissue Structures and Methods," dated May 29, 2019, 8 pgs.
The International Bureau of WIPO, International Preliminary Report on Patentability for International Application No. PCT/US2018/018036, entitled "Laparoscopic Training System," dated Aug. 29, 2019, 8 pgs.
The International Bureau of WIPO, International Preliminary Report on Patentability for International Application No. PCT/US2018/018895, entitled "Synthetic Tissue Structures for Electrosurgical Training and Simulation," dated Sep. 6, 2019, 7 pgs.
European Patent Office, Extended European Search Report for European Patent Application No. EP 20153338.7, titled "Advanced Surgical Simulation Constructions and Methods," dated Mar. 5, 2020, 7 pgs.
European Patent Office, Extended European Search Report for European Patent Application No. EP 19215545.5, titled "Advanced First Entry Model for Surgical Simulation," dated Mar. 26, 2020, 8 pgs.
"Surgical Female Pelvic Trainer (SFPT) with Advanced Surgical Uterus," Limbs & Things Limited, Issue 1, Jul. 31, 2003, URL:https://www.accuratesolutions.it/wp-content/uploads/2012/08/ Surgical_Female_Pelvic_Trainer_SFPT_with_Advanced_Uterus_User_Guide.pdf, retrieved Feb. 21, 2020, 2 pgs.

* cited by examiner

SYNTHETIC TISSUE STRUCTURES FOR ELECTROSURGICAL TRAINING AND SIMULATION

CROSS-REFERENCE TO RELATED APPLICATIONS

This application is a continuation of International Patent Application No. PCT/US2018/018895 entitled "Synthetic Tissue Structures for Electrosurgical Training and Simulation" filed on Feb. 21, 2018 incorporated herein by reference in its entirety which claims priority to and benefit of U.S. Provisional Patent Application Ser. No. 62/462,701 entitled "Synthetic Tissue Structures for Electrosurgical Training and Simulation" filed on Feb. 23, 2017 and incorporated herein by reference in its entirety.

FIELD OF THE INVENTION

This application relates to synthetic tissue for practicing electrosurgical procedures and, in particular, to conductive synthetic tissue material made from a cross-linked hydrogel and methods of manufacturing such material and synthetic tissue models.

BACKGROUND OF THE INVENTION

Advances in technology have led to an increased use of energy devices in surgical procedures. There is a need for synthetic tissue that closely resembles the response of human tissue to electrosurgery. The synthetic tissue would be advantageous to surgeons and residents for training purposes. The synthetic tissue requires several characteristics to closely resemble human tissue including the ability to be cauterized, cut, and fused when manipulated with energy devices. Additionally, the tissue needs to emulate the mechanical properties of real tissue such as elasticity, toughness, suturability, tactility, color and texture. Furthermore, the material needs to be moldable into a structure that mimics various human organs or membranes for simulating human anatomy. The synthetic tissue may also need to be bondable to a variety of thermoplastics and silicones to complete a simulated organ structure. The present invention addresses these needs.

SUMMARY OF THE INVENTION

According to one aspect of the invention, a simulated rectum model for use with electrosurgical devices is provided. The model includes a cylindrical tube comprising three layers and defining a central lumen. The central lumen has a proximal opening at a proximal end and a distal opening at a distal end. The three layers include a first layer made of an electrically conductive hydrogel comprising a dual interpenetrated cross-linked network having a first ratio of a covalently cross-linked acrylamide to an ionically cross-linked alginate. The model includes a second layer of an electrically conductive hydrogel comprising a dual interpenetrated cross-linked network having a second ratio of a covalently cross-linked acrylamide to an ionically cross-linked alginate. The model includes a third layer of an electrically conductive hydrogel comprising a dual interpenetrated cross-linked network having a third ratio of a covalently cross-linked acrylamide to an ionically cross-linked alginate. The first layer includes an inner surface defining the central lumen having a longitudinal axis. The third layer defines an outer surface of the cylindrical tube. The second layer is located between the first layer and the third layer.

According to another aspect of the invention, a method of making a simulated rectum model is provided. The method includes the steps of providing an uncured first hydrogel, an uncured second hydrogel and an uncured third hydrogel. The method includes the step of sequentially curing the first hydrogel, second hydrogel and third hydrogel to form a tubular structure having a first layer comprising the first hydrogel, a second layer comprising the second hydrogel and a third layer comprising the third hydrogel. The tubular structure has an outer surface and an inner surface defining an inner lumen.

According to another aspect of the invention, a simulated rectum model for training transanal minimally invasive surgery is provided. The model includes three substantially concentric layers, a first layer, a second layer and a third layer, made of electrically conductive hydrogel material sized and configured to simulate a mucosal layer, a muscle layer and a mesorectum layer, respectively. All of the layers are made of a dual interpenetrating cross-linked network having a ratio of covalently cross-linked acrylamide to ionically cross-linked alginate. The ratio can be the same for all layers or different based on the desired adhesion properties between any two layers. The model is capable of expanding in size when insufflated and capable of simulating a billowing condition. The model is dissectible with electrosurgical instruments. When dissected with electrosurgical instruments, the hydrogel material realistically causes char to build up on instruments and emits vapor simulating smoke from electrosurgery. Artificial polyps and transverse folds are molded on the inner surface of the model.

DETAILED DESCRIPTION OF THE INVENTION

Figure 1:
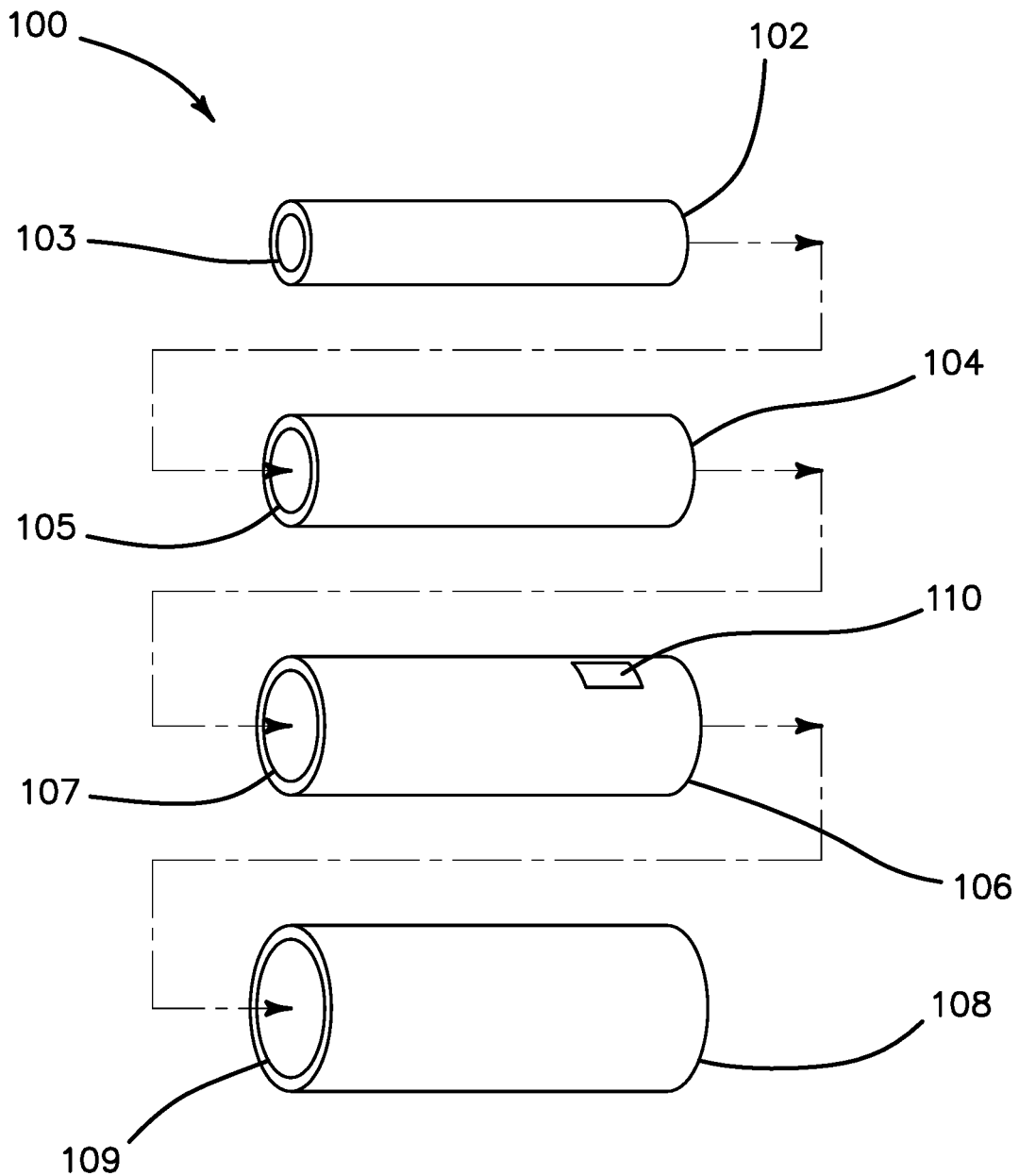
FIG. 1 is an exploded, top perspective view of an organ model according to the present invention.

The material of the present invention is made from a dual interpenetrated cross-linked hydrogel network. The hydrogel is a mixture of two cross-linked polymers: an ionically cross-linked alginate network and a covalently cross-linked polyacrylamide network. The gel material is prepared by mixing an 8:3 ratio of acrylamide to alginate and water. In order to make the organ or tissue parts that are more realistic, color can be incorporated into the process. The colorant is added prior to deionized water being mixed with the acrylamide and alginate solids. Half the water being used to form the gel is used to make the colorant. A wash is created with the water and drops of acrylic paints. The amount and color of paint used varies depending on the organ. See Table 1 below for organ color ratios that show how many parts of each color need to be mixed together for a particular organ and/or tissue part. The colored wash is then combined back with the other half of water and mixed with the acrylamide and alginate. Water content of the gel is approximately 86 weight percent. Ammonium persulfate (0.003 the weight of the acrylamide) and N,N-methylenebisacrylamide (0.006 the weight of acrylamide) are added to the solution as a photo initiator and a cross-linker respectively, for the acrylamide. Further, the solution is flushed with argon gas and N,N,N'N'-tetramethylethylenediamine (0.003 the weight of acrylamide) is added under an argon atmosphere as a cross-linking accelerator for the acrylamide. The final additive, calcium sulfate (0.136 weight of alginate), is an ionic cross-linker for the alginate. The slurry is constantly stirred throughout each step until the solution is homogeneous. The gel solution is cast into organ-shaped molds and placed in an 85° C. oven for 30 minutes to cure. See the Example below for a specific hydrogel procedure example. To obtain hollow organs, the gel solution can be painted onto a mandrel and placed under a heat lamp to cure. The cured product is a tough, clear hydrogel or colored replica of the organ or tissue. The application of hydrogel organs makes the organ trays for surgical training more dynamic, the trays become more life-like as well as energy device compatible.

In another variation, the material of the present invention is made from a dual interpenetrated cross-linked hydrogel network. The hydrogel is a mixture of two cross-linked polymers: an ionically cross-linked alginate network and a covalently cross-linked polyacrylamide network. The gel material is prepared by mixing an 8:3 ratio of acrylamide to alginate and water. In order to make organs or tissue parts that are more realistic, color can be incorporated into the process. A colorant solution is prepared separate from the acrylamide and alginate mixture to allow for accessibility of different pigments while molding various tissue or organs. The colorant solution is prepared by dissolving acrylic paints in deionized water. The amount and color of paint used varies depending on the organ. See Table I for organ color ratios that show how many parts of each color need to be mixed together for a particular organ and/or tissue part. From the total amount of water used to create the hydrogel, half the water comes from the colorant solution. The colored solution is then combined back with the other half of the water which is mixed with the acrylamide and alginate. The total water content of the gel is approximately 86 wt %. Ammonium persulfate (approximately 0.3% the weight of the acrylamide) and N,N-methylenebisacrylamide (approximately 0.6% the weight of acrylamide) are added to the solution as a photoinitiator and a cross-linker respectively, for the acrylamide. Further, the solution is flushed with argon gas for approximately 10-15 minutes in order to displace the air with an inert gas, and then N,N,N'N'-tetramethylethylenediamine (approximately 0.3% the weight of acrylamide) is added under an argon atmosphere as a cross-linking accelerator for the acrylamide. The final additive, calcium sulfate (approximately 13.6% weight of alginate), is an ionic cross-linker for the alginate. The slurry is constantly stirred throughout each step until the solution is homogeneous. The gel solution is cast into organ-shaped molds and placed in an 85° C. oven for 60 minutes to cure. See Example below for a specific hydrogel procedure example. To obtain hollow organs, the gel solution can be painted onto a mandrel and placed under a heat lamp to cure. The cured product is a tough, clear hydrogel or colored replica of the organ or tissue. The application of hydrogel organs makes the organ trays for surgical training more dynamic, the trays become more life-like as well as energy device compatible.

Organs and/or tissue made of the hydrogel of the present invention closely resemble and react to manipulation with energy devices similar to the way human organs do. The synthetic tissue made of the hydrogel of the present invention can be cut, cauterized and fused. Two layers of the hydrogel tissue according to the present invention can be separated along a plane using various monopolar and bipolar devices. Furthermore, vessels of the hydrogel can be fused and transected like real blood vessels. Mechanical devices such as scissors, graspers, and sutures can also be used on synthetic tissue made from the hydrogel of the present invention. The tissue has the strength to accommodate sutures and can be further reinforced with mesh to allow additional strength to accommodate sutures in a manner used for actual surgeries without concern for the suture tearing through the synthetic tissue and coming undone. In addition, when wetted the material becomes lubricious and slick making for a life-like feel. The compatibility of the hydrogel with other materials becomes useful when making large assemblies, such as organ trays comprising multiple tissue components for simulators because the synthetic organs not only need to bond to each other, but also are able to bond to the plastic base of the tray. The synthetic organs and tissues made of the hydrogel material should be stored in closed containers with minimal exposure to the atmosphere until ready for use. Due to being predominantly water, the hydrogel material can dry out over time if not stored properly. However, advantageously, the hydrogel of the present invention has the ability to reabsorb water allowing for it to rehydrate after losing moisture and to be used. Therefore, it is wetted, if needed, before use.

In another variation of the present invention, synthetic tissue is made as follows. Sodium metabisulfite is added as an additive to the above mentioned hydrogel. The sodium metabisulfite is added to the solution prior to the calcium sulfate. The amount utilized is equivalent to the amount of ammonium persulfate present in the gel solution. The addition of the sodium metabisulfite allows the gel to be cured at room temperature. Once cast, the hydrogel begins to instantly cure, thus the need for a secondary oven cure is no longer necessary. This process shortens the time required for producing the gel. However, the resulting tissue lacks the same tear strength, elongation, and work time as its oven-cured counterpart.

Another approach utilizes adjusting the ratios of ingredients already present in the hydrogel solution. The two polymers of the hybrid hydrogel are what allow the gel to be elastic and still hold its shape. The 8:3 polymer ratio of acrylamide to alginate in the gel can be adjusted to enhance different properties of the gel. The amount of acrylamide can be increased to increase flexibility and elasticity of the gel; inversely, if the amount of alginate is increased, brittleness is amplified and tear resistance is decreased. The cross-linkers are further responsible for certain characteristics. The cross-linkers essentially entangle the polymer strands together forming a polymer network. Increasing the amount of cross-linkers causes the hydrogel to cure faster and lack elasticity and an insufficient amount of cross-linkers causes the formation of a jelly rather than a gel. The amount of water can also be varied, with the amount of water being inversely proportional to hardness. Gel with higher water content will be softer and will have the formation of a jelly. Ultimately, the ingredients of the hybrid hydrogel can be utilized to enhance different physical and mechanical properties.

Two other examples of replacement hydrogels are an acrylic acid based gel and a clay-based gel. In the acrylic acid hydrogel, an acrylate polymer is created through the polymerization of acrylic acid in an aqueous solution neutralized by sodium hydroxide. A sodium metabisulfite-ammonium persulfate redox reaction acts as an initiator for the polymerization process. The clay-based hydrogel is a solution of sodium polyacrylate and clay nanosheets. A dendritic molecular binder (G3-binder) is added to the solution to initiate bonding. The resulting product is a clear, moldable hydrogel.

Besides hydrogel materials semiconductive silicones can be utilized to produce synthetic organs. Semiconductive silicones are silicone rubbers that have been doped with small particles of metal, commonly, nickel-graphite or aluminum. These metal particles essentially make a non-conductive silicone semiconductive by providing a medium for electricity to flow through. Semiconductive silicones are expensive and difficult to bond to other materials. In addition, the silicone needs to contain large amounts of metal particles to provide a short enough arcing distance for the electric current. The above materials and processes can similarly be engaged to manufacture organ trays that are energy compatible.

Figure 2:
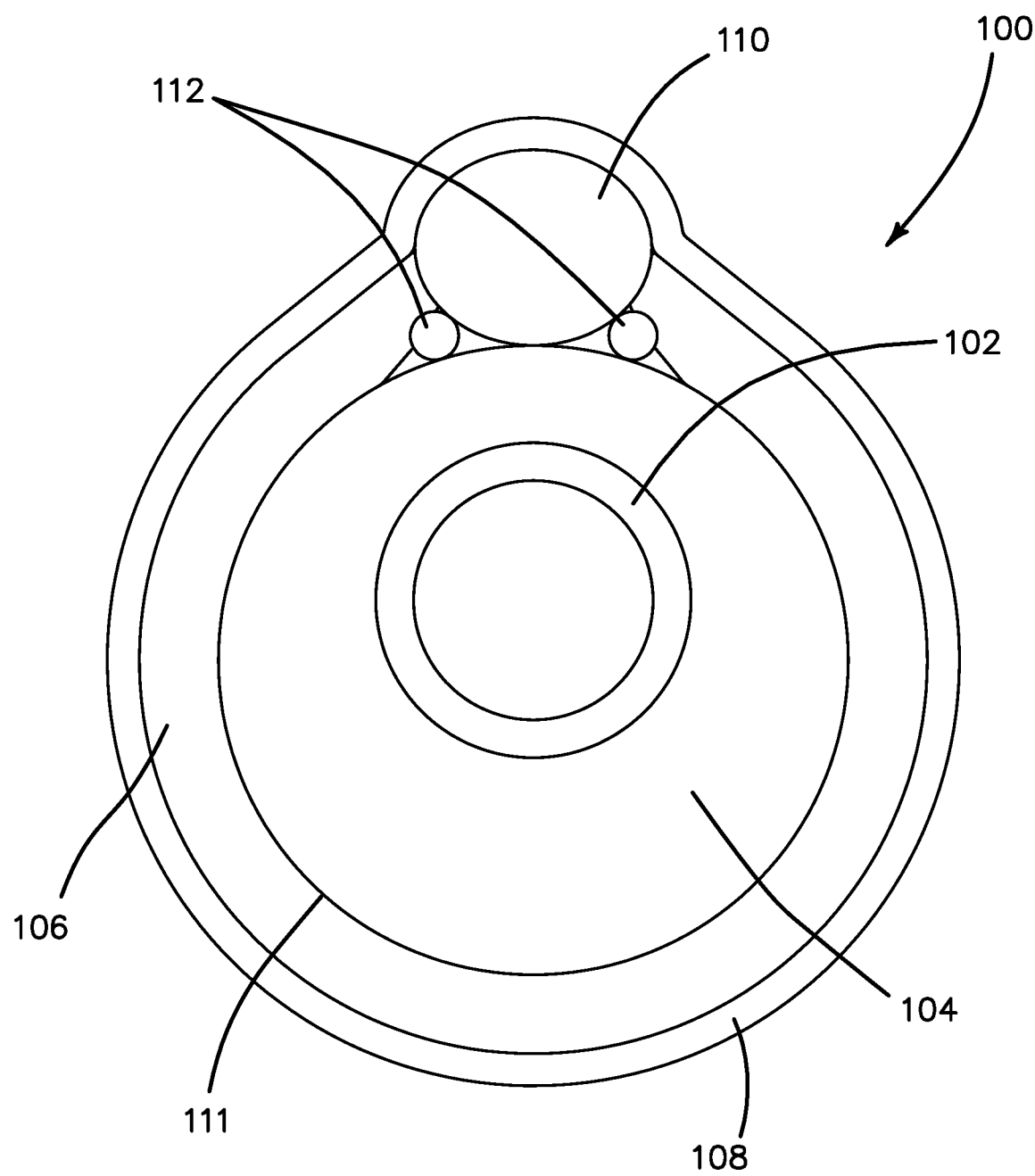
FIG. 2 is a side, cross-sectional view of a rectum model with a simulated prostate system according to the present invention.

An exemplary organ model made of hydrogel material compositions described in this specification is shown in FIGS. 1-3. The organ model is a simulated rectum model 100. The simulated rectum model 100 includes a first tube 102 made of any one of the hydrogel compositions described herein and dyed to have a pink color. In one variation, the hydrogel is selected to have a ratio of approximately 8:1 acrylamide to alginate and approximately 86% water. The first tube 102 defines a first lumen 103 extending between a proximal end and a distal end.

The simulated rectum model 100 further includes a second tube 104 defining a second lumen 105 and extending between a proximal end and a distal end. The second tube 104 is made of yellow dyed hydrogel of any one of the hydrogel compositions described herein. In one variation, the hydrogel is selected to have a ratio of approximately 8:1 acrylamide to alginate and approximately 86% water. The second lumen 105 is dimensioned to receive the first tube 102 inside the second lumen 105 in a concentric-like fashion. The second tube 104 is adhered to the first tube 102 using cyanoacrylate glue. Alternatively, the second tube 104 is cured onto the first tube 102 and no glue is employed. The yellow color of the second tube 104 is selected such that the second tube 104 represents the mesorectum of a human colon.

The model 100 further includes a third tube 106. The third tube 106 defines a third lumen 107. The diameter of the third lumen 107 is dimensioned to receive the second tube 104 inside the third lumen 107 in a concentric fashion. The third tube 106 is adhered to the second tube 104 by being cured on top of the second tube 104. The third tube 106 is made of any one of the hydrogel compositions described herein and dyed to have a yellow and/or orange color to represent a presacral fat layer. In one variation, the hydrogel is selected to have a ratio of approximately 8:1 acrylamide to alginate and approximately 86% water.

The simulated rectum model 100 further includes a fourth tube 108. The fourth tube 108 defines a fourth lumen 109. The diameter of the fourth lumen 109 is dimensioned to receive the third tube 106 inside the fourth lumen 109 in a concentric-like fashion. The fourth tube 108 is made of any one of the hydrogel compositions described herein and dyed to have a pink color. In one variation, the hydrogel is selected to have a ratio of approximately 8:1 acrylamide to alginate and 86% water. The fourth tube 108 is adhered to the third tube 106 with adhesive such as cyanoacrylate glue such as LOCTITE® 401 or 4902 cyanoacrylate glue manufactured by LOCTITE® of Westlake, Ohio. Alternatively, the fourth tube 108 is cured onto the third tube 106 and no adhesive is employed.

In one variation of the simulated rectum model 100, the simulated rectum model 100 further includes a simulated prostate system 110 located and embedded between the third tube 106 and the fourth tube 108. In one variation, the simulated prostate system 110 is located and embedded inside the third tube 106. The simulated prostate system 110 is located at the anterior side of the model 100. The simulated prostate system 110 includes any one or more of the following simulated anatomical structures: simulated prostate, simulated seminal vesicles, simulated bladder, simulated urethra, and simulated vas deferens. The simulated urethra and simulated vas deferens are made of silicone formed into a solid tube or other polymer. The simulated seminal vesicles are made of urethane or other foam overmolded onto the simulated vas deferens. The simulated prostate is made of urethane or other foam overmolded onto the simulated urethra.

In one variation of the simulated rectum model 100, the simulated rectum model 100 further includes one or more collagen layer (not shown) located in any one or more of the following locations: (1) between the second tube 104 and the first tube 102, (2) between the third tube 106 and the second tube 104. The collagen layer is wetted and placed onto the cured hydrogel tube which is then placed in an oven to adhere it. In one variation, the second tube 104 is covered with a thin layer of collagen and the third tube 106 is covered with a thin layer of collagen and electrosurgical dissection takes places between the two adjacent layers of collagen. In another variation, a thin collagen layer is applied to the third tube 106 only and dissection is between the second tube 104 and the collagen layer on the third tube 106. In another variation, a thin first collagen layer is applied to the second tube 104, a thin second collagen layer is applied to the first collagen layer. The prostate system 110 is adhered to the second collagen layer and care is taken to dissect around the prostate system between the first collagen layer and the second collagen layer. In another variation, a thin collagen layer is applied to the prostate system 110 and care is taken to dissect between the second tube 104 and the thin collagen layer to avoid the prostate system 110.

Figure 3A:
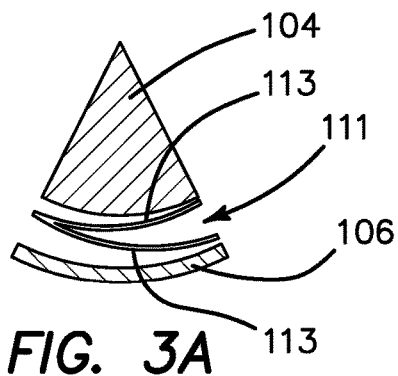
FIG. 3A is posterior, partial, cross-sectional view of two collagen layers located between a second tube and a third tube of a rectum model with according to the present invention.
Figure 3B:
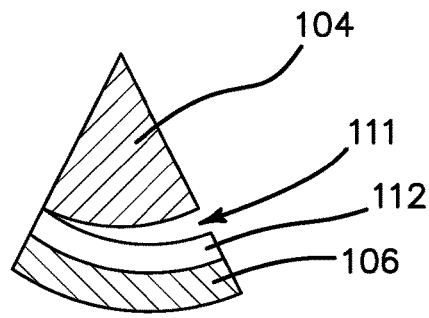
FIG. 3B is a posterior, partial, cross-sectional view of a second tube, third tube and a thin hydrogel layer of a rectum model according to the present invention.
Figure 3C:
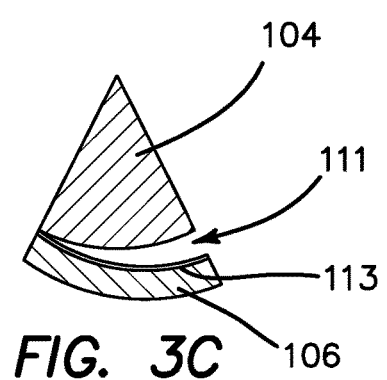
FIG. 3C is a posterior, partial, cross-sectional view of a second tube, third tube and a collagen layer of a rectum model according to the present invention.
Figure 4A:
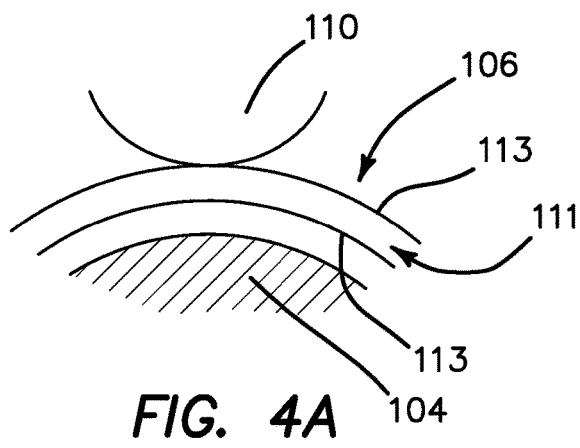
FIG. 4A is an anterior, partial, cross-sectional view of two collagen layers located between a second tube and simulated prostate system of a rectum model according to the present invention.
Figure 4B:
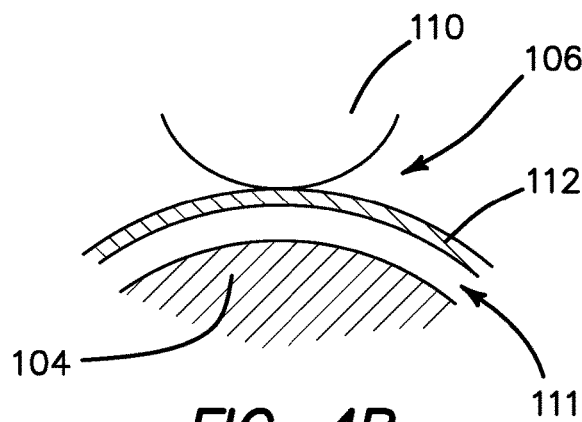
FIG. 4B is an anterior, partial, cross-sectional view of a thin hydrogel layer located between a second tube and simulated prostate system of a rectum model according to the present invention.
Figure 4C:
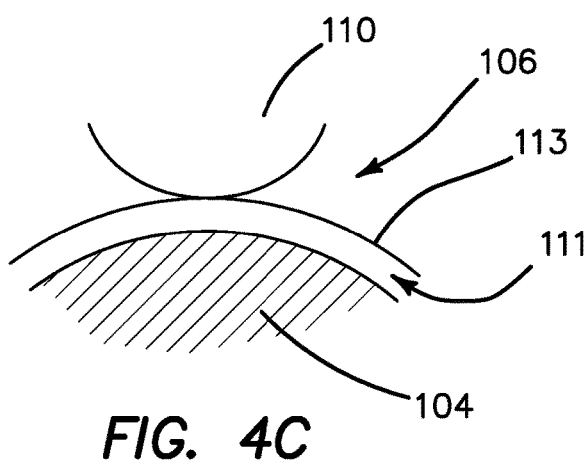
FIG. 4C is an anterior, partial, cross-sectional view of a collagen layer between a second tube and a simulated prostate system of a rectum model according to the present invention.

The simulated rectum model 100 is well-suited for practicing transanal total mesorectal excision (TaTME) for cancer located in the lower rectum using electrosurgical devices and electrosurgery techniques. In such a surgical procedure, the cancerous rectum is approached through the anus into the first lumen 103 via a sealable port that is connected to channel. A purse-string suture is tied to seal off the cancerous location of the rectum that includes the tumor. In order to practice this suture technique, the first tube 102 is optionally provided with an embedded mesh layer so that sutures would be held in the first tube 102 and not tear through the hydrogel when pulled. In another variation, the purse-string suture is pre-made during the manufacturing process so that the surgeon can visually locate the suture and only practice techniques subsequent to purse-string suture placement. In the practice of the procedure, the surgeon will commence to dissect in the posterior direction and electrosurgically cut down through first tube 102 and into the second tube 104 which represents the mesorectum and circumferentially around the second tube 104 between the second tube 104 and the third tube 106 being careful not to penetrate into the simulated prostate system 110 and not to penetrate into the fourth tube 108 as can be seen in FIG. 2. Care is also taken not to enter the simulated mesorectum (second tube 104) nor enter into the first tube 102. The user carefully practices to dissect circumferentially around the first tube 102. Exemplary posterior dissection locations and dissection pathways are illustrated in FIGS. 3A-3C. FIG. 3A illustrates a posterior dissection location between the second tube 104 and the third tube 106 and a dissection plane 111 in between two collagen layers 113 if they are employed. FIG. 3B illustrates a posterior dissection location with a dissection pathway between the second tube 104 and the third tube 106, and in particular, between the second tube 104 and a thin hydrogel layer 112 located between the third tube 106 and the second tube 104. FIG. 3C illustrates a posterior dissection location with a dissection pathway 111 between the second tube 104 and a collagen layer 113 adhered to the third tube 106. After dissecting posteriorly, anterior dissection begins by dissecting through the thinner layer of the second tube 104, visible in FIG. 2, until the third tube 106 is reached. Dissection proceeds between the second tube 104 and the third tube 106 along a dissection plane 111 until the posterior dissection is encountered. Exemplary anterior dissection locations and dissection pathways 111 that correspond to posterior dissection pathways 111 of the models configured as shown in FIGS. 3A, 3B and 3C are illustrated in FIGS. 4A, 4B and 4C, respectively. FIG. 4A illustrates an anterior dissection location with a dissection plane 111 lying between two collagen layers 113 if they are provided. FIG. 4B illustrates an anterior dissection location with a dissection plane 111 lying between the second tube 104 and the thin layer of hydrogel 112. FIG. 4C illustrates an anterior dissection location with a dissection plane 111 lying between the second tube 104 and collagen layer 113 if one is provided. Care is taken not to enter the third tube 106 to avoid risk damaging the prostate system 110.

The proximal end of the simulated rectum model 100 may be attached to a transanal adapter. The transanal adapter is a support used to space apart the top cover from the base of a surgical trainer to provide access into the model from the side of the surgical trainer. An example of a surgical trainer is described in U.S. Pat. No. 8,764,452 incorporated by reference herein in its entirety. The transanal adapter includes an opening that is connected to the first lumen of the first tube 102. Surrounding the opening of the transanal adapter, soft silicone is provided to simulate an anus. The practice of the surgical TaTME procedure is performed through the opening of the transanal adapter into the first lumen 103 as described above.

In one variation, the first tube 102 and the second tube 104 are made of hydrogel having a ratio of approximately 8:1 acrylamide to alginate and approximately 86% water and the third tube 106 and the fourth tube 108 are made of hydrogel having a ratio of approximately 8:3 acrylamide to alginate and approximately 86% water. Whereas the intersection of layers/tubes having the same ratio are substantially indistinguishable, the intersection of layers/tubes having different ratios are distinguishable making the intersection plane discernible and more easily separable, leading the practitioner along the correct dissection plane and making dissection easier than if the correct dissection plane was the intersection of layers/tubes having the same ratio.

The simulated rectum model 100 is assembled by first casting the material into hollow tube-like molds that are provided with mandrels. The casting of layers may begin from the innermost layer and proceed to the outermost layer or vice versa. For example, if the casting is to start from the innermost layer, a small tube is filled with material and allowed to cure in an oven. When removed from the small tube mandrel, the cured innermost layer is inserted into a larger diameter tubular mandrel of the desired diameter and the next layer is poured and allowed to cure. The combination is then removed and placed into a tubular mandrel having a larger diameter and the next layer is poured and so forth. Similarly, the model 100 may be constructed beginning with the outer layer and sequentially proceeding to the inner layer. Tubing is placed inside of a larger hollow tubing and the outermost space in between is filled with material until the desired layers is achieved working progressively until the innermost layer is poured. Any layer can be offset from the longitudinal axis to achieve a thicker or thinner layer posteriorly or anteriorly as needed such as for the second tube. If a purse-string suture is to be pre-made, the outer-to-inner manufacturing process would be employed. On the last innermost layer, instead of placing a mandrel in all of the way, material would be cast to completely fill in the rectum except for the top portion. On the top, a small mandrel would be placed allowing only the very top to be hollow. The mandrel could be designed to look like a purse-string, giving the user a visual cue that the purse-string suture has been already completed. To apply a collagen layer, synthetic or natural collagen casing is employed in the form of a sheet or cylinder. If provided in the form of a cylinder, it is cut into sheets. The collagen layer is then soaked in water and water is brushed onto the desired layer of application. The soaked collagen layer is then placed onto the layer of hydrogel. More layers are added as needed and the hydrogel layer and collagen layer are baked together in an oven to adhere the hydrogel to the collagen or the collagen to itself when multiple layers are employed side-by-side. The model 100 is held together by over molding the layers or with cyanoacrylate glue. Silicone components of the model 100 such as the prostate system 110 are adhered to the hydrogel or collagen using cyanoacrylate glue. Urethane molds are employed and the molds may be surface treated with in a variety of ways including but not limited to plasma treating and flame treating to make the mold hydrophilic and improve spreading of hydrogel material into the mold, especially for a hydrogel formulation that does not include sodium metabisulfide. Certain model organ parts, especially thin sheet-like parts such as a simulated peritoneum, are formed by polybag casting. In polybag casting, the hydrogel material is poured into a bag. Any air pockets are pressed out and the bag is sealed and placed between two flat trays. Weights of approximately 2.5-5.0 pounds were laid on top of the trays and allowed to cure into a flat sheet to create an artificial peritoneum or omentum. Artificial vasculature also made of hydrogel may be embedded by arranging the artificial vasculature inside the polybag. Also, smaller hollow molds are utilized to manufacture simulated hollow vessels.

Figure 5:
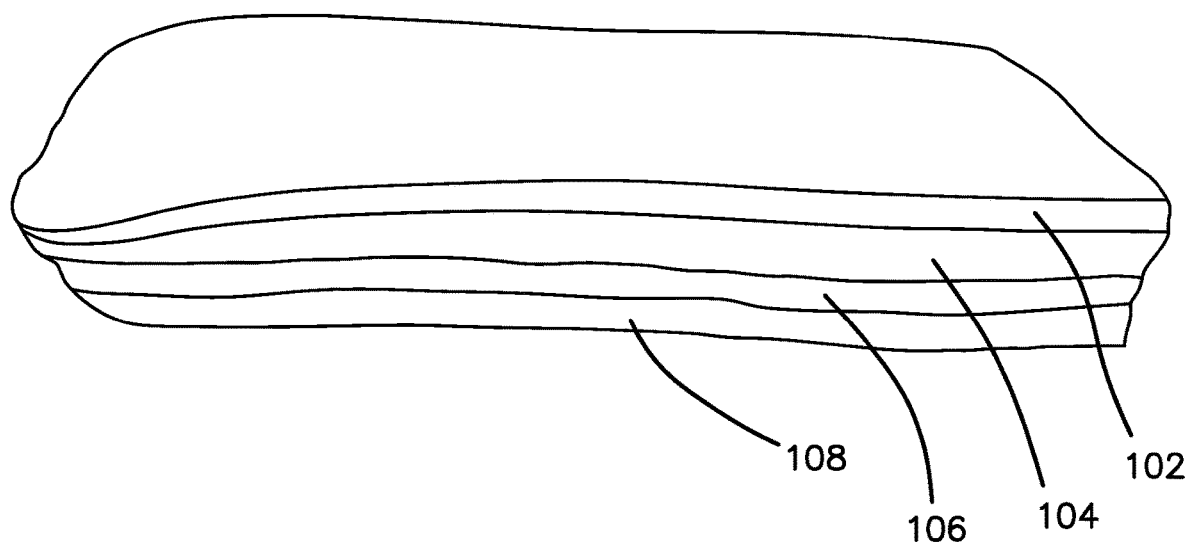
FIG. 5 is a top perspective view of a multi-layered hydrogel according to the present invention.

In another variation, the model 100 does not have a cylindrical shape to represent a rectum. Instead, the model 100 simply includes four layers 102, 104, 106, 108 from top to bottom in the shape of a rectangular or square block as if the cylinder were to be cut open and laid flat as shown in FIG. 5. The block configuration of the layers permits the user to practice the procedures without being confined to a lumen configuration with the procedures performed transluminally. The block allows practitioners to simply practice the electrosurgical techniques in a laparoscopic environment such with the model 100 placed inside a cavity of a surgical trainer between a top cover and a base. In such a variation, the first layer 102 and the second layer 104 are made of hydrogel having a ratio of approximately 8:1 acrylamide to alginate and approximately 86% water and the third layer 106 and the fourth layer 108 are made of hydrogel having a ratio of approximately 8:3 acrylamide to alginate and approximately 86% water.

Any one of the hydrogels disclosed in this specification can be used to form at least part of a simulated tissue structure for the practice of surgical techniques, especially laparoscopic electro-surgical procedures wherein the simulated tissue structure is disposed inside an enclosure substantially enclosing the simulated tissue structure. An example of an enclosure includes a laparoscopic trainer in which a laparoscope is utilized to visualize the surgical field. The simulated tissue structure is not limited to artificial vessels, arteries, veins, one or more organs and tissues, hollow or solid, associated with the human lower rectum as described above and suitable for practicing a TaTME procedure. Also, the TaTME model described above may be made with two layers of hydrogel instead of four layers. In such a model the two layers made of hydrogel include the rectum layer and mesorectum layer, the first tube 102 and the second tube 104, respectively, if the model is formed to have a tubular shape. A variation of such a TaTME model having two layers includes a mesh layer located between the two layers 102, 104. Of course, the TaTME model need not have a tubular shape. Any of the TaTME models may include artificial polyps to be practiced for removal using energy. A gallbladder model may include one or more of an artificial liver, artificial gallbladder, artificial peritoneum, artificial fascia, artificial duct(s), and one or more artificial artery. In an alternative variation of the gallbladder model, the artificial liver is excluded from being made of hydrogel and instead made of silicone or KRATON in order to localize the surge areas to the locations where a simulated procedure would be performed. A simulated tissue structure is substantially made of any one of the hydrogels described herein. In one variation, the simulated tissue structure includes an artificial human ovarian organ that includes one or more of a simulated ovary portion, a uterine horn portion, uterus, ovary, fallopian tube, vagina, cervix, bladder, omentum, and peritoneum. The peritoneum and omentum may further include embedded simulated vasculature, hollow or solid, also made of hydrogel. Other artificial organs that are made of hydrogel and form at least part of a simulated tissue structure include an artificial stomach, kidney, rectum, aorta, tumor, and polyp. Any of the simulated tissue structures made of hydrogel described herein may include a mesh layer. Also, the simulated tissue structure may include two different hydrogels forming different parts of the simulated tissue. For example, as described above, part of a simulated tissue structure may be made with a hydrogel having an 8:3 formulation and another part having an 8:1 formulation. Also, part of a simulated tissue structure may be formed of a hydrogel according to the present invention and part made of silicone or other material and attached, connected, adjacent or in juxtaposition to the part made of hydrogel. For example, in a simulated appendectomy model, an artificial colon is made of silicone and an artificial peritoneum and vessels are made of hydrogel having one or more formulation described herein. In another example, in a simulated gallbladder model the artificial liver is made of silicone or KRATON and all other parts of the gallbladder model are made of hydrogel having one or more formulation described herein. In another example, an artificial rectum is made of silicone and artificial polyps of hydrogel described herein are adhered to the silicone rectum using cyanoacrylate glue.

In use, the simulated tissue structure according to the present invention is configured for use with electrosurgical units, including but not limited to monopolar, bipolar, harmonic or other devices employed in electrosurgery, in order to provide a realistic medium configured into an anatomical portion for the practice of using electrosurgical units, electrosurgical techniques, surgical procedures employing electrosurgical units alone and with other instruments encountered in surgery. The handling of electrosurgical units requires practice as does employing surgical techniques and learning specific procedures performed with the electrosurgical units. When an electrosurgical unit is applied, heat is generated by the electrical current traveling between two polarities in a bipolar system or from one electrical polarity to a ground in a monopolar system. Typically, in a monopolar system, the artificial tissue structure is located above and in contact with a grounding plate/pad which is connected to a ground. In one variation of the simulated tissue structure according to the present invention, that portion of the structure that is composed of hydrogel is placed in direct contact with the grounding pad/plate or other conductive surface. In the event, the entirety of the simulated tissue structure is configured such that the hydrogel is not in direct contact with the grounding pad, a conductive pathway, such as a wire or the like, is provided to contact the hydrogel portion and then pass across non-conductive portions of the model to contact the grounding pad. For example, in a gallbladder model such as the model described in U.S. Patent Application Publication No. US 2014/0370477 to Applied Medical Resources Corporation in California, the anatomical portion is connected to a support in order to permit the model to stand upright. If any one of the liver, peritoneum, gallbladder, vasculature, fascia, duct system or other component of the model is made of hydrogel, a wire is passed into that portion and then fed to contact a metallic frame which is set inside the stand with the frame legs extending all the way through the stand to be exposed at the bottom surface of the stand which then can be place atop a grounding pad. When the hydrogel structure is contacted with an electrosurgical unit, the temperature of the hydrogel structure will increase to a temperature that begins to vaporize the water content of the hydrogel in the location of contact. Because the hydrogel contains approximately 86% water by weight of the hydrogel structure, the model will generate steam that mimics the smoke created during electrosurgery performed on human tissue. Advantageously, the water vapor of the hydrogel structure is not odiferous compared with the smoke produced by real tissue. With prolonged contact with the electrosurgical unit, the water content will be reduced in the location of contact advantageously creating a simulated fusion or seal of tissue typically encountered in real surgery. Hence, the present invention not only advantageously simulates the look and feel of tissue structures that would undergo procedures that employ electrosurgery, but also, responds in manner that mimics real electrosurgery when electrosurgery is applied to the simulated tissue structures. The hydrogel of the present invention can be utilized to simulate dissection of tissue in addition to sealing and/or fusion via an electrosurgical unit.

TABLE 1

| ORGAN | COLOR RATIO |
|---|---|
| Liver | 4 red:1 black |
| Gallbladder | 3 yellow:1 blue |
| Cystic duct | 3 yellow:1 blue |
| Kidney | 4 red:1 blue |
| Spleen | 4 red:1 blue |
| Pancreas | 4 yellow |
| Omentum | 4 yellow:1 white |
| Mesentery | 4 yellow:1 white (serial diluted 8 times) |
| Veins | 3 blue:0.5 black |
| Arteries | 5 red:0.25 black |
| Aorta | 4 red |

EXAMPLE

The following is an example procedure for making a simulated hydrogel liver according to the present invention. In a large glass beaker, add 33.75 g alginate and 90 g acrylamide. Dry mix the two solids until the mixture is uniform. Measure out 614 ml of deionized (DI) water. Add 307 ml (about half) of the 614 ml of DI water to the beaker with the powder mixture. Mix the solution to break apart any alginate adhered to the sides or bottom of the beaker. Once a homogenous solution is formed, maintain the mixing by placing the beaker under an overhead mixer or insert a stir bar and place on stir plate to continue mixing. The remaining 307 ml of water are added to a different beaker and used to prepare the colorant. For a simulated liver, 4 drops of red acrylic paint and 1 drop of black acrylic paint are added to the second jar of DI water and stirred on a stir plate until the water is a uniform color. The now colored 307 ml of DI water is combined back with the other half in the beaker of gel solution. The beaker of gel solution remains mixing on the overhead mixer or stir plate to dissolve all solids and allow for uniform mixing of the colorant. Keep solution stirring and add 0.250 g of ammonium persulfate (APS) and add 0.050 g N,N'-methylenebisacrylamide. Allow the APS and N,N'-MBAA to dissolve in the gel solution prior to proceeding. Hand mix as necessary, since the solution is viscous and the lighter additives will not readily mix with the mixers.

While on the overhead mixer or stir plate, insert a thin hose into the bottom of the beaker of gel solution, the hose should be connected to the argon gas tank. Bubble in a stream of argon gas into the beaker for approximately 15 minutes. Afterwards, remove the hose from the solution and allow hose to sit above the surface and blow a stream of argon gas on top of the gel solution for another 5 minutes. After flushing the solution with argon gas remove the thin hose from the jar. The following step is also completed under argon conditions. Flush the headspace of the N,N,N',N'-tetramethylethylenediamine (N,N,N',N'-TMEDA) bottle with argon. Using a micropipette, pipette 0.290 milliliters of argon gas from the N,N,N',N'-TMEDA bottle head space and eject the gas off to the side, this should be done twice in order to flush the interior of the micropipette. Now, extract 0.290 ml of N,N,N',N'-TMEDA from the bottle using the same micropipette tip and eject into the gel solution. The N,N,N',N'-TMEDA bottle should be sealed quickly after use and stored in a dark area, away from moisture.

Continue stirring, make a slurry of calcium sulfate dihydrate ($CaSO_4.2H_2O$) and DI water. Add approximately 25 ml of DI water to 4.59 g of $CaSO_4.2H_2O$. Mix thoroughly and add slurry to the hydrogel solution. Wash the remains of the $CaSO_4.2H_2O$ slurry with DI water and add to the hydrogel solution. Some white clouds may still remain from the addition of the $CaSO_4.2H_2O$. These clouds will disappear once hydrogel is cured. Allow gel slurry to mix at medium speed for approximately 1 minute. The gel slurry can now be poured into a liver mold and placed in an oven at 85° C. for 60 minutes to cure the gel. After 1 hour, the mold is removed from the oven and allowed to cool to room temperature. Once cool, the hydrogel liver can be removed from the mold. The final product is a life-like synthetic liver capable of being manipulated with energy devices in addition to mechanical devices.

In another variation, another simulated rectum model 200 made of at least one of the hydrogel materials described above will now be described in reference to FIGS. 6-15. The simulated rectum model 200 is particularly suitable for training residents and surgeons Transanal Minimally Invasive Surgery (TAMIS). Minimally invasive procedures advantageously result in decreased wound size, decreased pain, and rapid recovery. TAMIS utilizes specialized electrosurgical laparoscopic tools to provide a less invasive surgical option for polyp removal in patients with rectal tumors. Surgical residents as well as practicing surgeons undergo extensive training prior to being qualified to practice surgery on human patients. Currently, calf colons or calf colon iterations are used as training models for TAMIS. The calf colon as a training model responds to energy devices similarly as human tissue. The limitations of calf colon as a training model are that it does not include transverse-folds, polyps nor are there multiple tissue layers to dissect through. A major limitation to the calf colon is that it can only be used as a training model one time. As soon as the mucosal layer is cut the calf colon will billow and collapse. An iteration of the calf colon that addresses the limitation of a one-time use training model is to attach an electrical ground to the calf colon and surround the calf colon in gelatin, ensuring a hermetic seal over multiple uses. Accordingly, there is a need for a synthetic and high fidelity rectum model capable of electrosurgery to facilitate the training of surgeons.

The simulated rectum model 200 of the present invention is capable of simulating the human rectum for the practice of TAMIS and is conducive with devices and equipment used in the TAMIS procedure to address high anatomical fidelity and to be seamlessly incorporated into a laparoscopic training system as a tissue model. In a TAMIS procedure, a surgical access sleeve such as an access channel 240 is introduced through the anus and into the rectal cavity. A cap 242 is connected to the access sleeve 240 at the proximal end to provide platform for the insertion of various surgical ports 244. The access cap 242 may be made of penetrable gel providing a flexible and air-tight fulcrum that facilitates triangulation of standard instrumentation inserted through ports 244 located in the cap 242. The access cap 242 is used to hermetically seal the end of the rectal cavity and maintain insufflation pressure while allowing laparoscopic instruments to be used. The rectal cavity is insufflated with carbon dioxide gas via a valve 246 in the cap 242 and the diameter of the rectal cavity is increased to provide more working space for the procedure. Surgical tools including a laparoscope, grasper and hook (or energy device) are used through the trocars and or ports 244 placed through the cap 242. The surgeon uses the laparoscope to identify a polyp. Once the polyp is identified a series of dots are marked, by cautery, circumferentially around the polyp to identify the excision margin. The polyp is grasped and pulled from the rectal wall while the hook applies energy to dissect through the layers of tissue. Dissection of tissue layers are dependent on the stage of cancer and can be submucosal or a full thickness dissection. When the preferred plane of the rectum dissection is reached the dissection continues along that tissue plane and the circumferentially dotted path until the polyp has been fully removed. The hook and grasper are replaced with a pair of needle drivers and the wound site is then sutured closed.

The simulated rectum model 200 of the present invention is compatible with all devices and equipment used in the TAMIS procedure. The simulated rectum model 200 is also compatible with an insufflation device and is able to insufflate to an appropriate level. Furthermore, the present simulated rectum model 200 is capable of holding the insufflation to open the diameter of the lumen 203 of the model 200 and is able to hermetically seal against the access device 240 to minimize billowing and prevent collapse of the rectum. Furthermore, the present simulated rectum model 200 is conducive with graspers and sutures advantageously allowing it to be grasped, pulled and sutured but be pliable, with elasticity comparable to human tissue. The simulated rectum model 200 is also electrically conductive and has material properties such that it is compatible with the cutting feature of electrosurgical devices.

Figure 15:
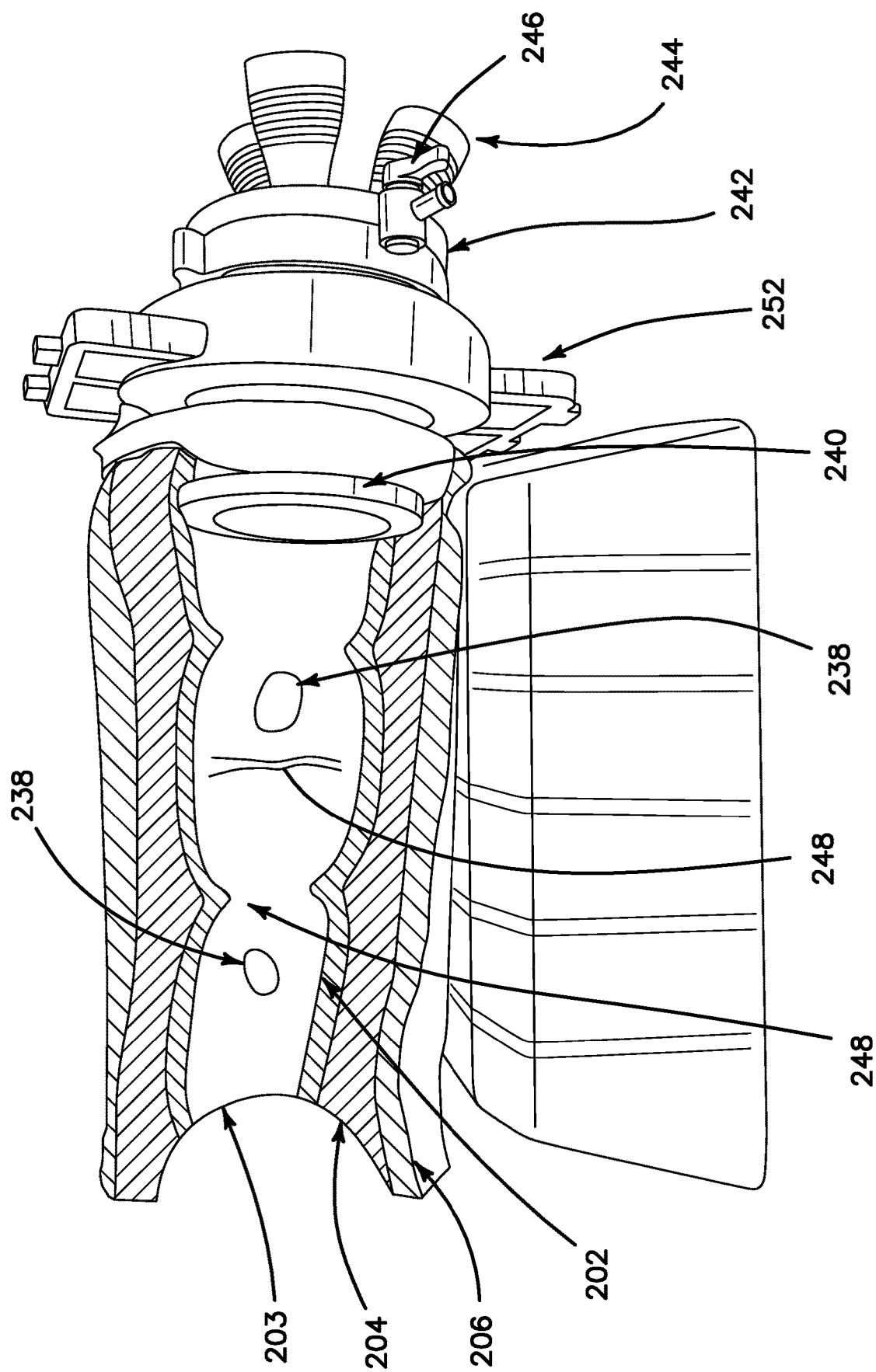
FIG. 15 is a cross-sectional view of a simulated rectum model attached to an access sleeve passing through a transanal adapter for lateral access to a surgical trainer and a gel cap connected to the access sleeve according to the present invention.

Furthermore, as will be seen hereinbelow, the present simulated rectum model 200 incorporates relevant pathology and anatomical features of a generic patient. As such, the simulated rectum model 200 includes the anatomical pathology of a standard TAMIS patient such as polyps 238 shown in FIGS. 8 and 15. The simulated rectum model 200 incorporates the anatomical features of a human rectum including the transverse folds 248 (also known as Valves of Houston) and the three distinct tissue layers of the rectum as can be seen in FIG. 15. The three distinct tissue layers are pigmented to accurately identify the simulated pink mucosal layer 202, the simulated white muscle layer 204 and the simulated yellow mesorectum layer 206. These three tissue layers 202, 204, 206 are realistically thick in the present model 200 and are formed concentrically around the central lumen 203 of the model 200 that simulates the rectal cavity. The simulated rectum model 200 of the present invention is compatible with surgical trainers and is provided with the ability to repeatedly practice the procedure on a single model. The model 200 is also user friendly. For example, the user cannot inadvertently perforate the hermetic seal.

The simulated rectum model 200 is made of hydrogel that closely resembles and reacts to manipulation with energy devices similar to the way human organs do. The hydrogel of the present invention can be cut, cauterized and fused. Two layers of hydrogel can be separated along a tissue plane using various monopolar and bipolar devices. Mechanical devices such as scissors, graspers, and sutures can also be used on the simulated organ model 200. The simulated organ model 200 has the strength to accommodate sutures in the manner used for actual surgeries without concern for the suture tearing through the synthetic tissue and coming undone. In addition, when wetted the hydrogel material of the present invention becomes lubricious and slick giving a lifelike feel. Therefore, the simulated rectum model 200 of the present invention provides an excellent simulation for a TAMIS procedure.

The simulated rectum model 200 of the present invention is made of hydrogel material that is composed of a dual interpenetrated cross-linked hydrogel network having any one or more compositions described above in this specification in addition to any one or more hydrogel compositions described hereinbelow. The hydrogel network results in a material that is tough enough to be grasped and hold sutures but elastic enough to be comparable to human tissue. As described above, the hydrogel is a mixture of two cross-linked polymers, an ionically cross-linked alginate network inducing material conductivity, and a covalently cross-linked polyacrylamide network. The gel material is prepared by mixing an approximately 8:1 ratio of acrylamide to alginate in a water solution. When cut with an electrosurgical device the conductivity of the hydrogel material and the high volume of water dispersed throughout the cross-linked polymer network allow for the material to behave like human tissue and vaporize mimicking an actual electrosurgical procedure. In another variation, hydrogels made of different ratios of acrylamide and alginate can be used to make any or all layers of the model in order to increase the anatomical representation of each layer to make it either a tougher and less elastic material or a less tough and more elastic material. In another variation, hydrogels made of different ratios of acrylamide and alginic acid can be used for the whole model for either a tougher and less elastic material or a less tough and more elastic material.

The high surface tension of water and the high proportion of water interspersed in the cross-linked polymer network allows for a hermetic material structure capable of insufflating and holding insufflation. In order for the model to be hermetic, anatomically accurate and connect to an access device such as a gel access port, the shape of the model 200 can be similar to the shape of a cylindrical vessel as can be seen in FIG. 2. The cylindrical shape of the model 200 will have one end that is sealed and the opposite end that is open to allow for access and device and instrument attachment. To fit within the confines of a laparoscopic training system the model is approximately 8 inches long.

Figure 10:
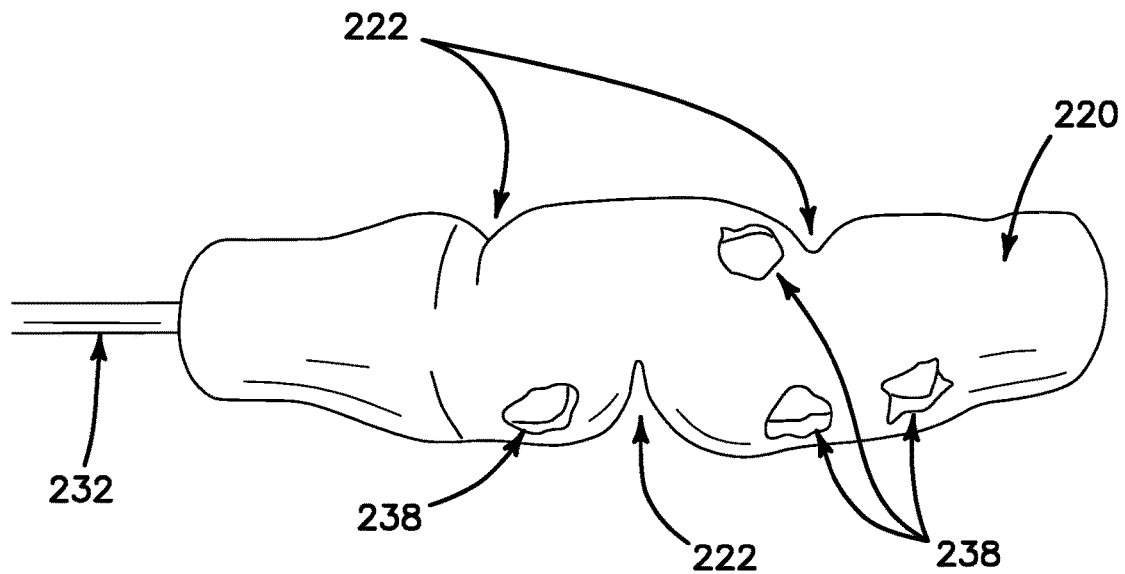
FIG. 10 is a top perspective view of an inner mold of a mucosal layer mold according to the present invention.
Figure 11:
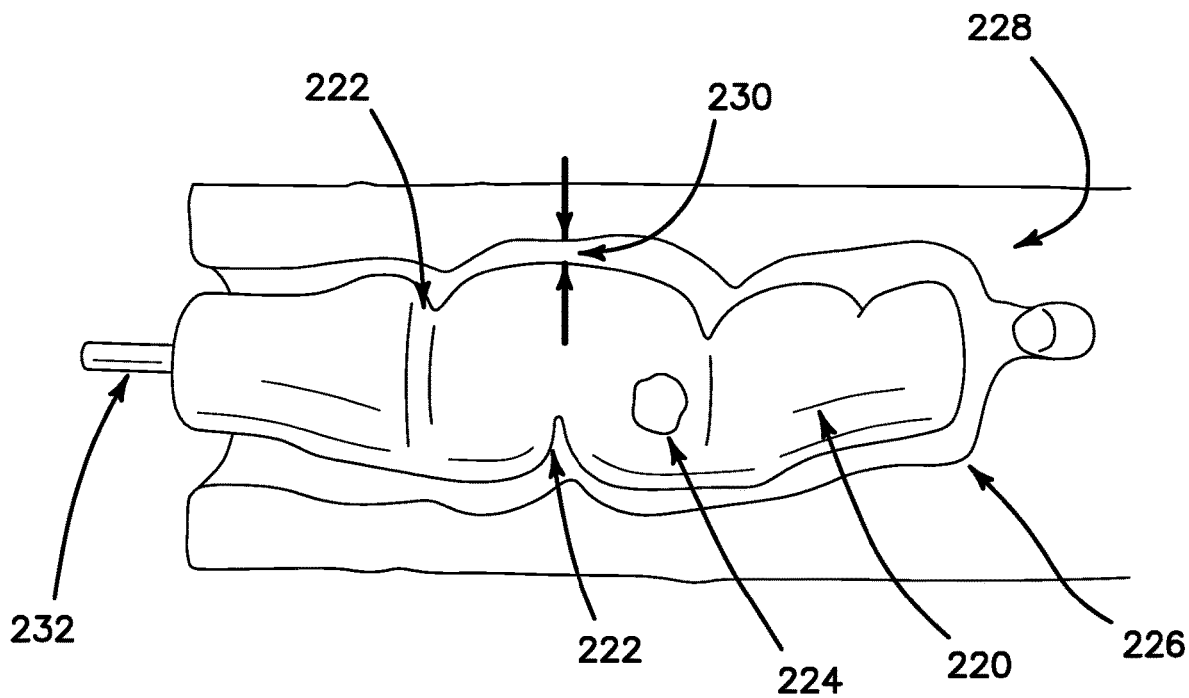
FIG. 11 is a top perspective view of an inner mold located inside half of an outer mold of a mucosal layer mold according to the present invention.
Figure 12:
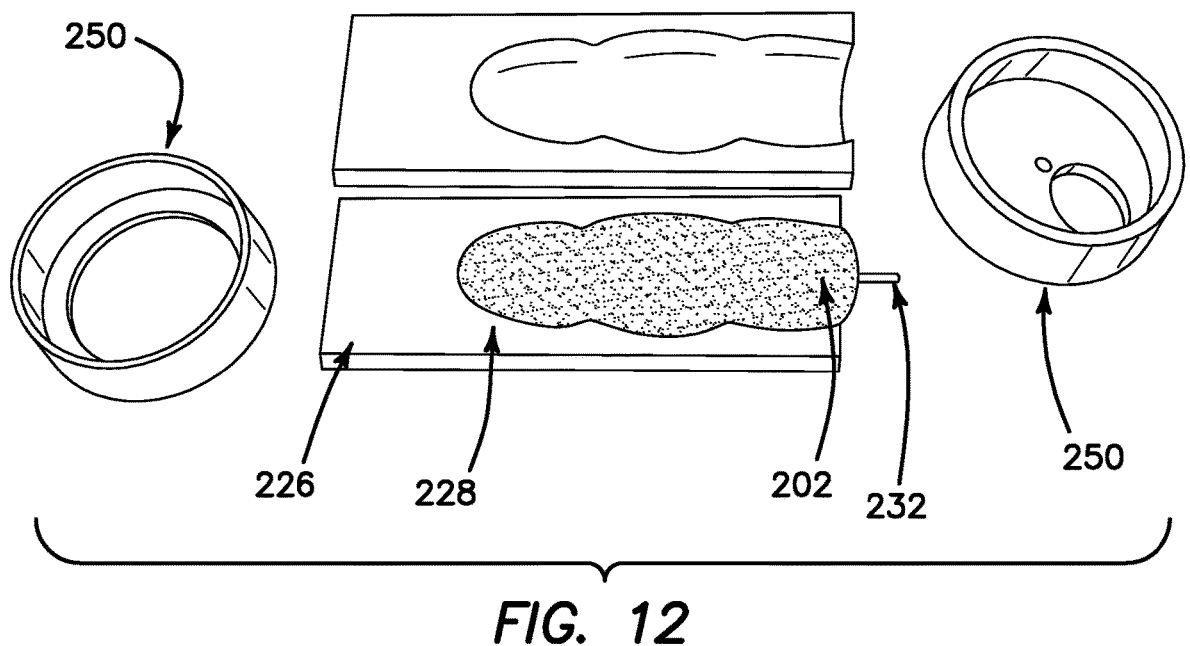
FIG. 12 is a top perspective view of a mucosal layer overmolded onto an inner mold, two halves of an outer mold and two end caps of a mucosal layer mold according to the present invention.

In order to address the anatomical features, the hydrogel material is pigmented and, subsequently, cast-molded to form the complex features of the patient pathology and human rectum anatomy necessary for the TAMIS model. The hydrogel model 200 can be pigmented for anatomical differentiation in tissue layers with acrylic paints dissolved in the deionized water solution comprising the hydrogel mixture. For a hydrogel model that simulates a TAMIS procedure, the hydrogel can contain three distinctly pigmented tissue layers to simulate an inner pink mucosal layer 202, a middle white muscle layer 204 and an outer yellow mesorectum layer 206. Each tissue layer is directly cast concentrically around a rectal cavity core inner mold 220. With reference to FIGS. 10-11, the rectal cavity core inner mold 220 is designed as a solid representation of the rectal cavity complete with semi-lunar grooves 222 to simulate the Valves of Houston. Additionally, the rectal cavity mold 220 contains a number of bulbous cavities 224 to simulate the polyps when the hydrogel material is cast into them.

To create the TAMIS simulated rectum model 200 using hydrogel, three batches of the 8:1 hydrogel solution described above were made and cast individually to represent the mucosal, muscle and mesorectum tissue layers. The mucosal layer batch is made by formulating a batch of hydrogel to contain approximately 337 mL of deionized water. The muscle and mesorectum layer batches were made by formulating a batch of hydrogel to contain approximately 644 mL of deionized water each. Based on the associated tissue layer, acrylic paint quantities were added to all but approximately 30 mL of the deionized water allotment. To make the mucosal layer, red (approximately 0.0035 wt % of the hydrogel batch mass), white (approximately 0.0017 wt % of the hydrogel batch mass), yellow (approximately 0.0009 wt % of the hydrogel batch mass) and blue (approximately 0.000435 wt % of the hydrogel batch mass) acrylic paints were used. To make the muscle layer, white (approximately 0.0035 wt % of the hydrogel batch mass) acrylic paint was used. To make the mesorectum layer, red (approximately 0.0026 wt % of the hydrogel batch mass), white (approximately 0.0052 wt % of the hydrogel batch mass), and yellow (approximately 0.0261 wt % of the hydrogel batch mass) acrylic paints were used. All batches of approximately 8:1 hydrogels are proportional in reagents and can be scaled to any volume necessary. Each cross-linked hydrogel network of the approximately 8:1 ratio hydrogel, acrylamide and alginate respectively, can be prepared by dry mixing the hydrogel reagents with the exception of the hydrogel cross-linkers. As a result, the dry reagents can be combined in the following proportions: alginic acid sodium salt (approximately 1.4 wt % of the total hydrogel mass), acrylamide [≥99% pure] (approximately 11.6 wt % of the total hydrogel mass), ammonium persulfate [≥98% pure] (approximately 0.278 wt % of the acrylamide mass), N,N'-methylenebisacrylamide [≥99.5% pure] (approximately 0.056 wt % of the acrylamide mass). The dry reagents can be thoroughly mixed and slowly added to a vortexing solution of deionized water (approximately 79 wt % of the total hydrogel mass) containing any acrylic paint according to the desired tissue layer. The unlinked hydrogel solution is then aerated by bubbling argon gas [99% pure] through the solution while continuing to mix for approximately 15 minutes. The mixture is then allowed to continue mixing in an argon atmosphere for additional 5 minutes. The argon gas is removed and the cross-linker for alginate and the cross-linking accelerator for the acrylamide are added in the following proportions, respectively: calcium sulfate dehydrate [≥98% pure] (approximately 13.64 wt % of the alginic acid sodium salt mass) and N,N,N',N'-tetramethylethylenediamine [≥99% pure] (approximately 0.026 wt % of the acrylamide mass). Calcium sulfate dehydrate can be added to deionized water (approximately 7.7 wt % of the total hydrogel mass) and sonicated under heat prior to incorporating into the hydrogel solution. The mixture is allowed to vortex and mix thoroughly an additional two minutes at which point it is immediately cast into the desired mold. Each layer is cast into a mold which represents the outer surface geometry of that layer. Similarly these layers are directly cast around the previous hydrogel layer outer surface geometry to create adjacent and in some cases contouring surfaces. Once casted the mold can be placed in an oven at approximately 80° C. for 45-90 min, or until gelation is complete. Layers can be sequentially molded such that each layer is cast within approximately 6 hours of casting the previous layer which will ensure that the two layers are adhered together without the need for glue. For increased fidelity of the model, the inner and outer surfaces of the mucosal tissue layer 202 as well as the inner surface of the muscle layer 204 are molded to contour the shape of the rectal cavity 203 including the transverse folds 248, polyps 238 and other curvatures, resulting in a realistic wall thickness of approximately 1.5 mm to 2 mm for the mucosal tissue layer 202. In one variation, the outer surface of the muscle layer 204 includes transverse folds and, in another variation, the outer surface of the muscle layer 204 is smooth and cylindrical.

The simulated rectum model 200 includes a first layer 202 having an outer surface and an inner surface and defining a first lumen 203, a second layer 204 having an outer surface and an inner surface defining a second lumen 205 and a third layer 206 having an outer surface and an inner surface defining a third lumen 207. To manufacture the simulated rectum model 200, an inner mold 220 is provided as shown in FIG. 10. The inner mold 220 includes an elongate form that is sized and configured to resemble the inner surface of a human colon/rectum. In particular, the inner mold 220 includes grooves 222 that resemble the transverse folds of Valves of Houston in a real human rectum. The inner mold 220 may also include one or more indentations also called polyp cavities 224 that are sized and configured to resemble real polyps found in a human colon. The inner mold 220 further includes a mandrel 232 extending along a longitudinal axis. Referencing FIGS. 9 and 11, the inner mold 220 is placed into the mucosal layer mold 226 shown in FIG. 11. The mucosal layer mold 226 is an cylindrical canister having one or more end cap 250 with an inner surface of the outer mold 228 having a shape that conforms to the shape of the inner mold 220 to create a gap 230 between the inner mold 220 and the inner surface of the outer mold 228 as shown in FIG. 11. The outer mold 228 is made of two half molds to facilitate removal of the first layer 202 when the hydrogel is finished gelling/curing. With the inner mold 220 centered concentrically within the outer mold 228 of the mucosal layer mold 226, the end caps 250 are attached and the inner mold 220 is rotated relative to the outer mold 228 to rotationally align the inner mold with the outer mold to create a conforming gap 230 having a substantially uniform thickness. Alignment markings may be provided on the inner and outer molds. The hydrogel preparation for the first layer 202, which is the simulated inner mucosal pink layer, is poured/injected in through an opening in the mucosal layer mold 226 such as an opening 252 in an end cap 250.

Figure 6:
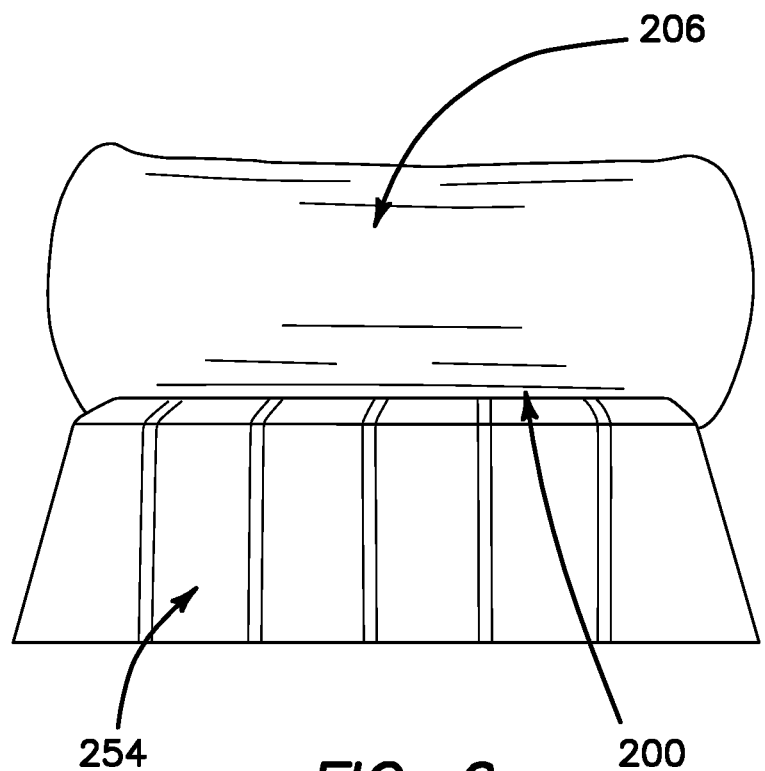
FIG. 6 is a side elevation view of a simulated rectum model according to the present invention.
Figure 7:
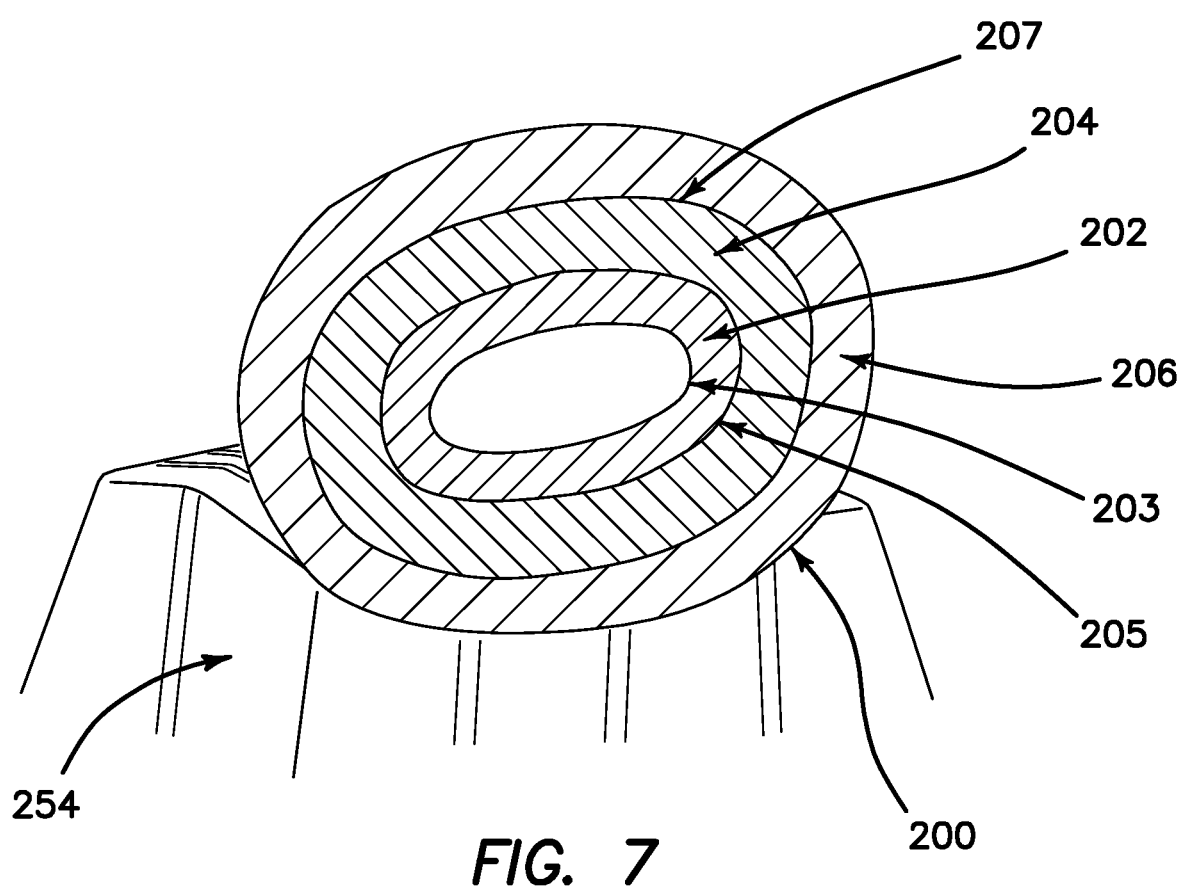
FIG. 7 is an end view of a simulated rectum model according to the present invention.
Figure 9:
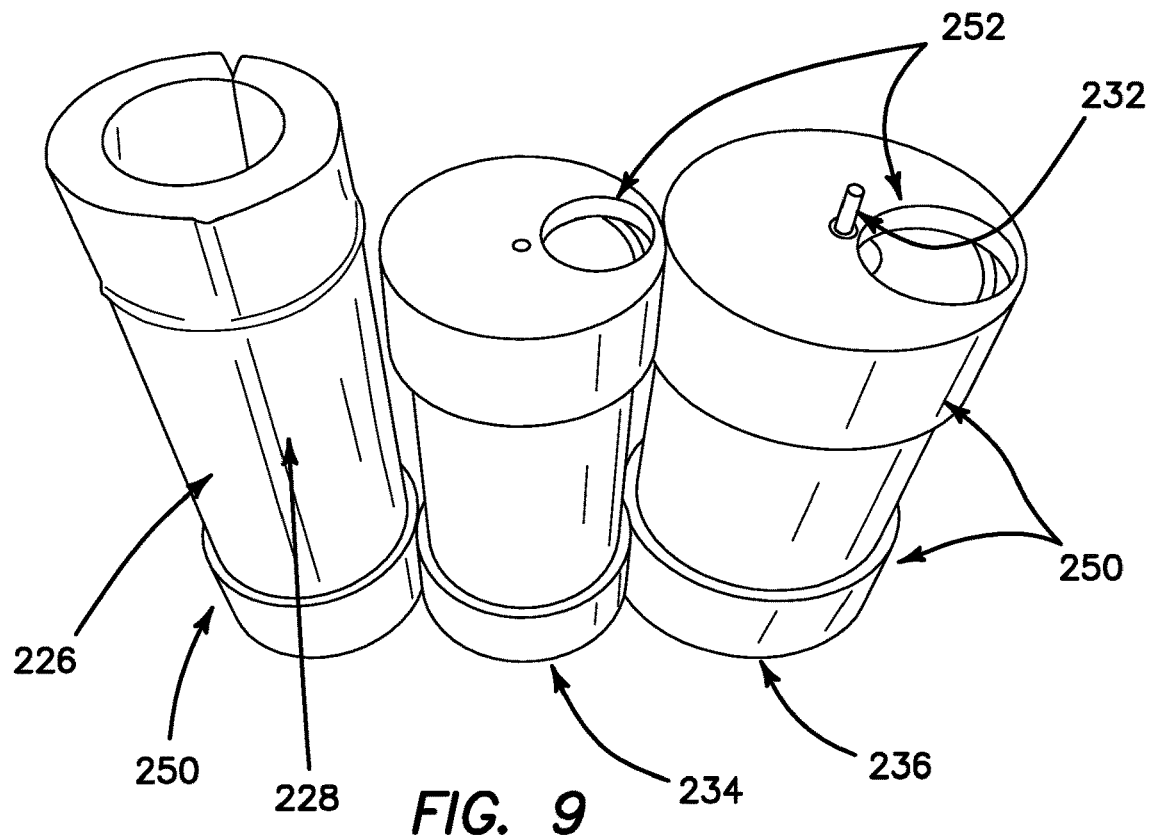
FIG. 9 is a top perspective view of a mucosal layer mold, a muscle layer mold, and a mesorectum layer mold according to the present invention.
Figure 13:
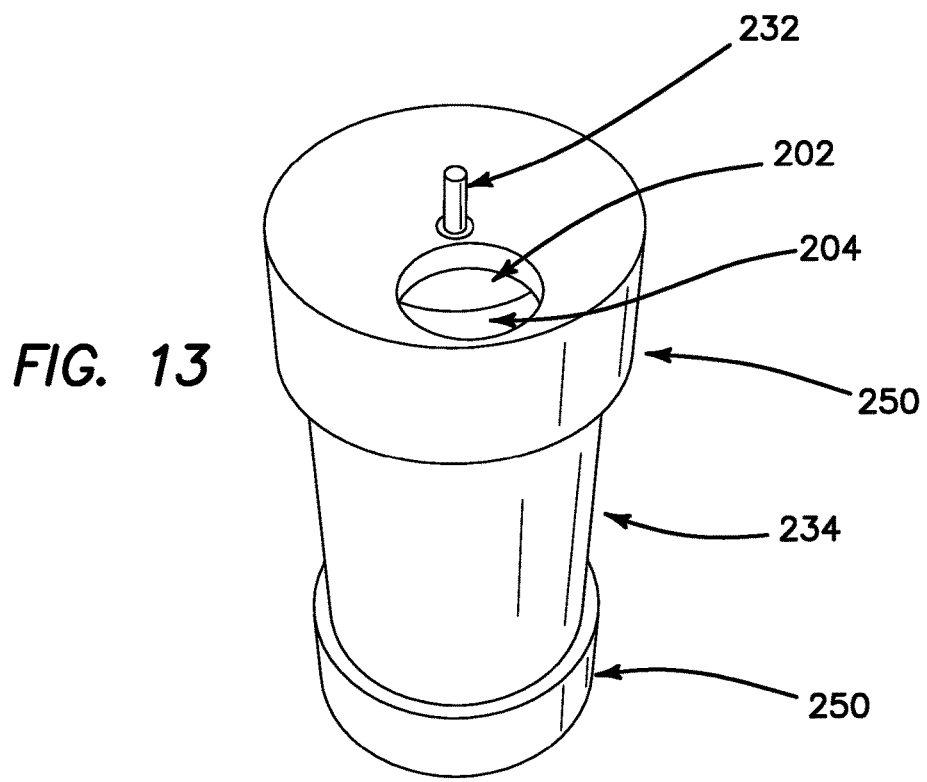
FIG. 13 is a top perspective view of a muscle layer mold assembly according to the present invention.
Figure 14:
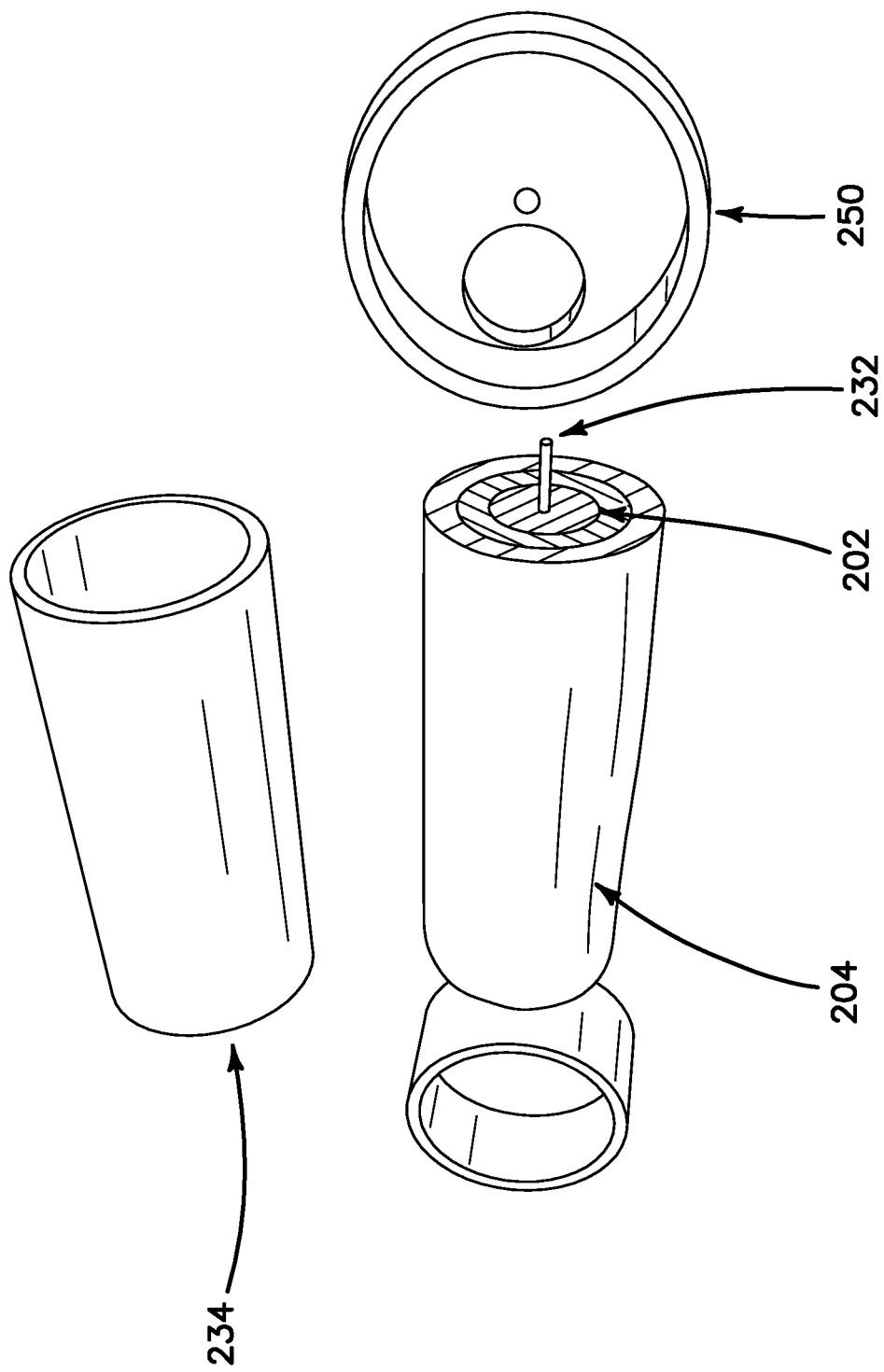
FIG. 14 is a top perspective view of a muscle layer overmolded onto a mucosal layer overmolded onto an inner mold with a mandrel, and a muscle layer mold with two end caps according to the present invention.

The hydrogel material is poured to fill the gap 230 to form the first layer 202. The mandrel 232 is rotated to ensure even coverage around the mandrel 232. The mold assembly 226 is placed into an oven for about an hour. After the first layer 202 is cured, the first layer 202 and the inner mold 220 are removed from the outer mold 228. The two halves of the outer mold 228 are separated to reveal the first layer 202 overmolded on the inner mold 220. The inner mold 220 together with the overmolded first layer 202 are transferred to the muscle layer mold 234 and located concentrically therein. The muscle layer mold 234 is shown in FIG. 9. The muscle layer mold 234 is cylindrical in shape and includes two end caps 250 and is approximately 3.5 inches in diameter. The hydrogel material for the middle, white, muscle layer 204 is poured through an opening in the end cap 250 into the muscle layer mold 234 to form the second layer 204. The hydrogel mixture is poured such that the hydrogel mixture fills the space between the first layer 202 and the inner surface of the cylindrical muscle layer mold 234 as shown in FIG. 13. The muscle mold assembly 234 is placed in an oven at 80 C for about one hour. After approximately one hour, the muscle mold assembly 234 is removed from the oven and, as shown in FIG. 14, the mandrel 232 is removed from the outer canister to reveal a second layer 204 that has a smooth outer surface that matches the inner surface of the canister of the muscle layer mold 234. The second layer 204 has an inner surface that corresponds and matches the outer surface of the first layer 202. The second layer 204 which represents the white muscle layer is overmolded onto the first layer 202 which represents the mucosal layer which is overmolded onto the mandrel 232. Next, the mandrel 232, first layer 202 and second layer 204 are transferred and placed concentrically inside the mesorectum layer mold 236. The mesorectum layer mold 236 is shown in FIG. 9. The hydrogel mixture for the outer, yellow, mesorectum layer is made and poured into the mesorectum mold assembly to form the third layer 206. The hydrogel mixture is poured between the outer surface of the second layer 204 and the inner surface of the cylindrical mesorectum layer mold 236. The mesorectum mold assembly 236 is placed in an oven at 80 C for about an hour. After approximately one hour, the mesorectum mold assembly 236 is removed from the oven. The mesorectum layer mold 236 is opened to reveal the third layer 206 which represents the yellow mesorectum layer having a smooth cylindrical outer surface that matches the smooth inner surface of the mesorectum layer mold 236 as shown in FIGS. 6-7. The third layer 206 is overmolded onto the second layer 204 which represents the white muscle layer which is overmolded onto the first layer 202 which represents the inner pink mucosal layer which is overmolded onto the mandrel 232. The mandrel 232 is then removed and the simulated rectum model 200 is completed with the resulting model having a first layer 202 having a substantially uniform thickness with respect to the inner surface and the outer surface of the first layer 202 except for in the location of simulated polyps wherein the thickness of the first layer 202 may be increased. Because of the matching uniform thickness, the outer surface of the first layer 202 includes grooves that correspond to ridges in the inner surface of the first layer 202 in the same location as the grooves. A convexity formed in the outer surface is reflected as a concavity formed in the inner surface of the first layer 202. As such, the first layer 202 has a substantially uniform thickness with complimentary features formed in the inner surface and the outer surface.

Figure 8:
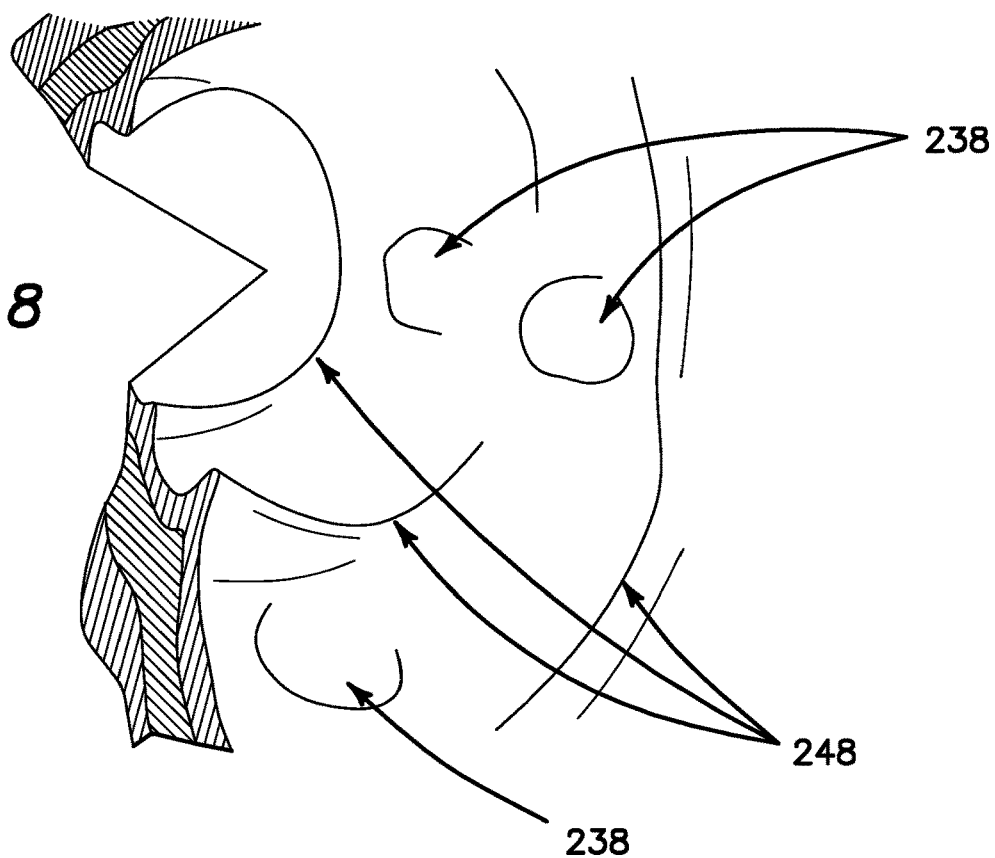
FIG. 8 is a cross-sectional view of a simulated rectum model according to the present invention.

The simulated rectum model 200 includes a first tube 202 having an outer surface and an inner surface defining a first lumen 203. The first tube 202 is made of a hydrogel comprising a dual interpenetrated network of ionically cross-linked alginate and covalently cross-linked acrylamide having a first ratio of acrylamide to alginate. The simulated organ model 200 includes a second tube 204 having an outer surface and an inner surface defining a second lumen. The second tube 204 is made of a hydrogel comprising a dual interpenetrated network of ionically cross-linked alginate and covalently cross-linked acrylamide having a second ratio of acrylamide to alginate. The first tube 202 is coaxially located inside the second lumen such that the outer surface of the first tube 202 is in contact with the inner surface of the second tube 204. The second tube 204 is overmolded onto the first tube 202 to achieve its disposition and attachment to the first tube. The simulated organ model 200 includes a third tube 206 having an outer surface and an inner surface defining a third lumen. The third tube 206 is made of a hydrogel comprising a dual interpenetrated network of ionically cross-linked alginate and covalently cross-linked acrylamide having a third ratio of acrylamide to alginate. In one variation, the first, second and third ratios are the same and are 8:1 or 8:3. In another variation the first, second and third ratios are selected to be 8:1 or 8:3 in any combination thereof. The first tube 202 and the second tube 204 are coaxially located inside the third lumen such that the outer surface of the second tube 204 is in contact with the inner surface of the third tube 206. The third tube 206 is overmolded onto the second tube 204. The outer surface of the third tube 206 is substantially smooth and cylindrical in shape. The inner surface of the first tube 202 includes one or more polyps 238 extending inwardly into the first lumen 203, as can be seen in FIG. 8, and includes one or more surface features such as ridges of the transverse folds 248 extending substantially circumferentially around the inner surface and substantially perpendicularly to the longitudinal axis of the model 200. The first tube 202 has a substantially uniform thickness. The outer surface of the first tube 202 includes grooves in locations corresponding to the ridges 248 on the inner surface to maintain a substantially uniform thickness of the first tube between the inner surface and the outer surface. The second tube 204 includes an inner surface that corresponds in shape to the outer surface of the first tube 202. The outer surface of the second tube 204 is substantially smooth and cylindrical in shape. The inner surface and the outer surface of the third tube 206 are substantially smooth and have a cylindrical shape. The model 200 is a procedural-based model for practicing transanal minimally invasive surgery wherein the first tube 202 simulates the mucosal layer and is colored pink, the second tube 204 simulates the muscle layer and is colored white, the third tube 206 simulates the mesorectum layer and is yellow in color, and the simulated polyps 238 are integrally formed with the first tube 202. In another variation, both the inner and outer surfaces of the first tube 202 (mucosal layer) and second tube 204 (muscle layer) are molded to concentrically contour to the shape of the rectal cavity and the transverse folds, providing a thickness of approximately 1.5 mm-2 mm of wall thickness. In another variation, only the inner surface of the first tube 202 (mucosal layer) is molded to form the shape of the rectal cavity and the transverse folds 248 providing a realistic appearance.

The level of adherence that fuses the layers within the simulated model of this invention can be varied by varying the hydrogel formulation that makes up each layer. For example, the adherence between two layers in which both layers are made up of a hydrogel having an 8:1 ratio of acrylamide to alginate is strong and the layers cannot be delaminated from one another with the use of blunt force. This high bond strength encourages training and use of energy instruments and methods. Since there is a strong bond between the layers that are being separated, the energy instrument will have to be used to separate the layers from one another without concern for the layers separating under force encountered in the manipulation of the layers as they are cut for polyp excision. Additionally, the resulting material with an 8:1 formulation is softer, more pliable, and flexible than a material layer made up an 8:3 ratio. The increased flexibility of the a material layer made of an 8:1 formulation allows an increased mobility of the layer as it is being retracted during the dissection and excision process of the procedure. This flexibility more closely mimics the tissue movement found during a real TAMIS procedure.

In another variation, the adherence between two layers in which one layer is composed of a hydrogel material having an 8:1 ratio of acrylamide to alginate and a second layer is composed of a hydrogel material having an 8:3 ratio of acrylamide to alginate is less than the adherence property between two layers having an 8:1 ratio of acrylamide to alginate. The weaker adherence strength can have advantages within the TAMIS model including an easier dissection simulation which could be beneficial for a novice trainee. However, a limitation of this layering combination is that the simulation could be too easy for a trainee. Additionally, there could be inadvertent separation of layers upon pulling and tugging with surgical instruments which would lead to an unrealistic simulation condition.

In another variation, the adherence between two layers in which both layers are made up of a hydrogel having an 8:3 ratio of acrylamide to alginate is weaker than both previous variations. That is the level of adherence between two 8:1 layers and between one 8:1 layer and one 8:3 layer is stronger than the level of adherence between two layers having an 8:3 ratio. Hence, the adherence strength between two 8:3 material layers is the weakest amongst the other variations described above. Consequently, dissection is too easy and the risk of inadvertent layer separation is more pronounced in this variation. The bond strength between one layer having and 8:1 ratio and a second layer having an 8:3 ratio is less than the bond strength between two layers having 8:1 ratios but greater than the bond strength between two layers having 8:3 ratio formulations.

The advantages and limitations of each variation of the material composition of TAMIS layers for a partial and full thickness polyp excision will now be described in greater detail. In a first variation, the simulated mucosal layer (first layer) is made of a hydrogel of the like described above having a ratio of acrylamide to alginate of 8:1, the simulated muscle layer (second layer) is made of a hydrogel of the like described above having a ratio of acrylamide to alginate of 8:1 and the simulated mesorectum layer (third layer) is made of a hydrogel of the like described above having a ratio of acrylamide to alginate of 8:1. In this variation, there is a strong bond between the first layer and the second layer and a strong bond between the second layer and the third layer. In partial thickness polyp removal, this first variation provides a strong bond and advantageously increases the difficulty of practicing separating the first layer from the second layer. This first variation also provides improved tactile feedback and mobility of the first layer due to the flexible 8:1 layer in a simulated partial thickness polyp removal procedure. Also, this variation does not present separation problems between the second layer and the third layer during partial thickness excision due to the high bond strength therebetween during a simulated partial thickness poly removal. In full thickness polyp removal, this variation advantageously provides a strong bond between the second layer and the third layer which thereby increases the difficulty of the training. Also, this variation provides improved tactile feedback and mobility of the second layer due to the flexibility of the 8:1 composition. Advantageously, there is no separation between the first layer and the second layer during the practice of a full thickness polyp removal procedure due to the high bond strength therebetween provided by the 8:1 formulation in both layers.

In a second variation, the simulated mucosal layer (first layer) is made of a hydrogel of the like described above having a ratio of acrylamide to alginate of 8:1, the simulated muscle layer (second layer) is made of a hydrogel of the like described above having a ratio of acrylamide to alginate of 8:1 and the simulated mesorectum layer (third layer) is made of a hydrogel of the like described above having a ratio of acrylamide to alginate of 8:3. In this variation, there is a strong bond between the first layer and the second layer and a relative medium adherence between the second layer and the third layer. In the practice of a simulated partial thickness polyp removal procedure using this second variation, a strong bond is provided between the first layer and the second layer, thereby, increasing the difficulty of practicing separating the first layer and the second layer. This second variation also provides improved tactile feedback and mobility of the first layer due to the flexible 8:1 composition in a simulated partial thickness polyp removal procedure. Also advantageously, this second variation does not present separation problems between the second layer and the third layer during partial thickness excision due to the medium bond strength therebetween. However, there is a possibility of a loss of structure if the second layer separates from the third layer making the simulation unrealistically challenging. In a simulated full thickness polyp removal procedure, this variation provides a strong bond between the first layer and the second layer and advantageously alleviates separation of the first layer and the second layer. The relatively weaker bond strength between the second layer and the third layer makes full thickness poly excision training on this model variation relatively easier and more suitable for a novice. As a drawback for training purposes, this second variation may make separation of the second and third layers too easy and not challenging enough for a more experienced trainee.

In a third variation, the simulated mucosal layer (first layer) is made of a hydrogel of the like described above having a ratio of acrylamide to alginate of 8:1, the simulated muscle layer (second layer) is made of a hydrogel of the like described above having a ratio of acrylamide to alginate of 8:3 and the simulated mesorectum layer (third layer) is made of a hydrogel of the like described above having a ratio of acrylamide to alginate of 8:3. In this third variation, there is a relatively medium adherence strength between the first and second layer and a weak adherence strength between the second layer and the third layer. The practice of a partial thickness polyp removal procedure using a model according to this third variation may be more suitable for a novice due to the easier dissection arising from lower bond strength. The separation between the second and third layer may be too easy and may occur inadvertently during the simulation. Also, there is a chance of loss of structure if the second layer separates from the third layer making the simulation unrealistically challenging. In a simulated full thickness polyp removal, this third variation of the model may be more suitable for a novice due to the easier dissection between the second and third layers. Also, inadvertent separation between the first layer and the second layer may occur due to the weaker bond strength. Another limitation of the third variation is poor tactile feedback and mobility of the second layer due to it being made of an 8:3 ratio hydrogel formulation having a greater stiffness.

In a fourth variation, the simulated mucosal layer (first layer) is made of a hydrogel of the like described above having a ratio of acrylamide to alginate of 8:1, the simulated muscle layer (second layer) is made of a hydrogel of the like described above having a ratio of acrylamide to alginate of 8:3 and the simulated mesorectum layer (third layer) is made of a hydrogel of the like described above having a ratio of acrylamide to alginate of 8:1. In this fourth variation, there is a relatively medium adherence strength between the first and second layer and a medium adherence strength between the second layer and the third layer. The practice of a partial thickness polyp removal procedure using a model according to this fourth variation may be more suitable for a novice due to the easier separation and dissection arising from lower bond strength. The separation between the second and third layer may be too easy and may occur inadvertently during the simulation. Also, there is a chance of loss of structure if the second layer separates from the third layer making the simulation unrealistically challenging. In full thickness polyp removal, this fourth variation of the model may be more suitable for a novice due to the easier dissection between the layers. Also, in the practice of full thickness polyp removal, the simulation of dissection and separation of the second layer and third layer may be too easy. Also, separation between the first layer and the second layer may occur due to the weaker bond strength therebetween. Another limitation of the fourth variation is poor tactile feedback and mobility of the second layer due to it being made of an 8:3 ratio hydrogel formulation.

In a fifth variation, the simulated mucosal layer (first layer) is made of a hydrogel of the like described above having a ratio of acrylamide to alginate of 8:3, the simulated muscle layer (second layer) is made of a hydrogel of the like described above having a ratio of acrylamide to alginate of 8:1 and the simulated mesorectum layer (third layer) is made of a hydrogel of the like described above having a ratio of acrylamide to alginate of 8:3. In this fifth variation, there is a relatively medium adherence strength between the first and second layer and a medium adherence strength between the second layer and the third layer. The practice of a partial thickness polyp removal procedure using a model according to this fifth variation may be more suitable for a novice due to the easier separation and dissection arising from lower bond strength. The separation between the second and third layer may be too easy and may occur inadvertently during the simulation. Also, there is a chance of loss of structure if the second layer separates from the third layer making the simulation unrealistically challenging. Also, the first and third layers have reduced tactile feedback and mobility due to the stiffer 8:3 ratio layer. The practice of full thickness polyp removal using this fifth variation of the model may be more suitable for a novice due to the easier dissection between the layers. Also, there is an improved tactile feedback and mobility in the second layer due to the increased flexibility of the hydrogel having the 8:1 ratio formulation. Also, in the practice of full thickness polyp removal, the simulation of dissection and separation of the second layer and third layer may be too easy and not challenging enough for more advanced practitioners. Also, separation between the first layer and the second layer may occur inadvertently due to the weaker bond strength therebetween.

In a sixth variation, the simulated mucosal layer (first layer) is made of a hydrogel of the like described above having a ratio of acrylamide to alginate of 8:3, the simulated muscle layer (second layer) is made of a hydrogel of the like described above having a ratio of acrylamide to alginate of 8:1 and the simulated mesorectum layer (third layer) is made of a hydrogel of the like described above having a ratio of acrylamide to alginate of 8:1. In this sixth variation, there is a relatively medium adherence strength between the first and second layer and a high adherence strength between the second layer and the third layer. The practice of a partial thickness polyp removal procedure using a model according to this sixth variation may be more suitable for a novice due to the easier separation and dissection arising from a relatively lower bond strength between the first and second layer. The separation between the first and second layer may be too easy and may occur inadvertently during the simulation. Also, the first layer has a reduced tactile feedback and mobility due to the stiffer 8:3 ratio layer. In practicing full thickness polyp removal, this sixth variation of the model provides a strong bond between the second and third layer making it more challenging to train full thickness polyp excision. Also, there is improved tactile feedback and mobility in the second layer due to the increased flexibility of the hydrogel having the 8:1 ratio formulation. Also, in the practice of full thickness polyp removal, there may be separation between the first layer and the second layer due to the weaker bond strength relative to the stronger bond strength between the second and third layers.

In a seventh variation, the simulated mucosal layer (first layer) is made of a hydrogel of the like described above having a ratio of acrylamide to alginate of 8:3, the simulated muscle layer (second layer) is made of a hydrogel of the like described above having a ratio of acrylamide to alginate of 8:3 and the simulated mesorectum layer (third layer) is made of a hydrogel of the like described above having a ratio of acrylamide to alginate of 8:1. In this seventh variation, there is a relatively weak adherence bond strength between the first and second layer and a relatively medium adherence strength between the second layer and the third layer. The practice of a partial thickness polyp removal procedure using a model according to this seventh variation may be more suitable for a novice due to the easier separation and dissection arising from a weak bond strength between the first and second layer. The separation between the second and third layer may be too easy and may occur inadvertently during the simulation. Also, there is poor tactile feedback and mobility of the first layer due to it being stiffer from the 8:3 ratio formulation. Loss of structural integrity may occur if the second layer separates from the third layer making the simulation unrealistically challenging. In practicing full thickness polyp removal, this seventh variation of the model is more suitable for a novice due to the easier dissection; however dissection between the second and third layer may be too easy and inadvertent separation may occur due the weaker bond strength. Also, there is loss of tactile feedback and mobility in the second layer due to the decreased flexibility of the second layer due to the hydrogel having the 8:3 ratio formulation.

In an eighth variation, the simulated mucosal layer (first layer) is made of a hydrogel of the like described above having a ratio of acrylamide to alginate of 8:3, the simulated muscle layer (second layer) is made of a hydrogel of the like described above having a ratio of acrylamide to alginate of 8:3 and the simulated mesorectum layer (third layer) is made of a hydrogel of the like described above having a ratio of acrylamide to alginate of 8:3. In this eighth variation, there is weak adherence bond strength between the first and second layer and a weak adherence bond strength between the second layer and the third layer. The practice of a partial thickness polyp removal procedure using a model according to this eighth variation may be more suitable for a novice due to the easier separation and dissection arising from a weak bond strength between the first and second layer. However, the separation between the second and third layer may be too easy and may occur inadvertently during the simulation. There is poor tactile feedback and mobility of the first layer due to it being stiffer from the 8:3 ratio formulation. The second layer may separate inadvertently from the third layer due to the weaker bond strength and loss of structural integrity may occur making the simulation unrealistically challenging. In practicing full thickness polyp removal, this eighth variation of the model is more suitable for a novice due to the easier dissection; however, dissection between the second and third layer may be too easy and inadvertent separation may occur due the weaker bond strength. Also, there is loss of tactile feedback and mobility in the second layer due to the decreased flexibility of the second layer due to the hydrogel having the 8:3 ratio formulation.

In use, the simulated rectum model 200 is employed with a surgical trainer having a cavity defined between a top cover and a base. The simulated rectum model 200 is placed inside the cavity of the surgical trainer and generally obscured from direct observation by the user. A laparoscope is employed and inserted into the cavity to observe the model and enable the practice of laparoscopic procedures with a video feed of the scope being displayed on a video monitor. The scope along with other instruments may be inserted through the top cover or laterally between the top cover and the base. An example of a surgical trainer suitable for use with the model is described in U.S. Pat. No. 8,764,452 and is incorporated by reference herein in its entirety. One end of the model 200 is attached to a lateral access support or leg 252 as shown in FIG. 15. In FIG. 15, the top cover and base of the surgical trainer are not shown. The leg 252 is connected to the trainer and includes an aperture. The leg 252 may also be called a transanal adapter; and surrounding the aperture of the transanal adapter, soft silicone is provided to simulate an anus. The practice of the surgical TaTME procedure is performed through the opening of the transanal adapter into the first lumen 103 as described above. The practice of the surgical TAMIS procedure is performed through the opening of the transanal adapted into the first lumen 203 as described above. The model 200 is supported on a stand 254 as shown in FIG. 6 and the lumen 203 of the first tube or first layer 202 is attached to the lateral access support leg 252 such that the aperture of the leg 252 provides access into the first lumen 203. The proximal end of the model 200 may be stretched over an extension in the support leg 252 to attach the model 200 to the support leg 252. Alternatively, an access channel 240 is inserted through the aperture in the support leg 252 and the proximal end of the model 200 is stretched around the distal end of the access channel 240 to create a seal sufficient to successfully insufflate the inner lumen 203. FIG. 15 illustrates a cross-sectional view of the model 200 whose distal end would be sealed for insufflation. On the outer side of the support leg 252, the proximal end of the access channel 240 is closed and sealed with a gel cap 242 that includes a number of ports 244. An elastic band may be provided around the proximal end of the model 200 to seal the attached part of the model 200 to the leg 252 or access channel 240. A laparoscope is inserted laterally through one of the ports 244 in the cap 242 into the first lumen 203 which is the simulated rectum to investigate and make an observation of the polyps 238 as shown in FIG. 15. The user will then take an electrosurgical instrument and insert it through one of the other ports 244 in the cap 242 to practice removal of the one or more polyps 238 while observing the procedure via the laparoscope image displayed on a video monitor. Depending on the stage of pathology type, the user may just clip the polyp 238 off at the inner surface of rectal cavity 203 defined by the simulated mucosal layer that is pink formed by the first tube 202. This clipping may be performed with the present model without an electrosurgical device. If the stage of the pathology is more advanced, such as a level stage two cancer, the user will practice dissecting with an electrosurgical instrument around the simulated polyp and to the white middle layer which simulates the muscle layer formed by the second tube 204 which serves as an identifying layer in the model 200. If the pathology type is more advance, such as a stage three cancer, the user will practice dissecting with an electrosurgical instrument around the targeted simulated polyp 238 and to the yellow outer layer 206 which simulates the mesorectum formed by the third tube 206 and serves as the identifying layer. An even more advanced pathology type would require dissecting through all of the three layers which would result in a whole portion of the simulated colon 200 being removed and a procedural-based model that is suitable for a total mesorectal excision (TME) would be employed for the practice of stage four pathology. The simulated rectum model 200 is suitable to simulate procedures requiring excision of polyps 238 reaching and including stage three pathologies. The simulated yellow mesorectum layer 206 can be cut into but the layer 206 is preferably not punctured in the practice of the these procedures using the simulated rectum model 200 as puncturing the third layer 206 would cause the model 200 to collapse due to the escape of insufflation gas and loss of pressurization. The model 200 is advantageously suitable for practicing insufflation procedures and performing the excision under insufflated conditions. In such a variation, the distal end of the first lumen 203 is seal or closed or no opening is provided. A successful dissection with the model 200 would be based on the stage type and would be to remove all material from the previous tissue layer. For example, for stage 2, all mucosal material is removed, for stage 3 all mucosal and muscle material is removed below the polyp and enclosed by the dotted dissection ring without significantly removing material from the next layer. It is not possible to do a perfect dissection between planes so the quality of the dissection is at the discretion of professionals reviewing and evaluating the practice procedure on a case-by-case basis.

Other simulated models such as those made up of synthetic rubber-like materials, such as silicone, can also be used for training a TAMIS procedure. These silicone models are tubular structures with polyps. However, silicone-based models cannot be used with insufflation and energy devices which are commonly used during such a procedure. As a result, there is a gap in training for the TAMIS procedure when using silicone-based models. In contrast, the hydrogel TAMIS model described within this present invention allows for the use of insufflation and electrosurgical instruments which more closely mimics the surgical setting when performing a TAMIS procedure. Having the ability to use insufflation with the model described in this present invention allows the lumen to enlarge in size to create a working space inside the lumen sufficient for instruments, scopes and the like. The model of the present invention also allows the trainee to learn how to handle a billowing situation that occurs due an imbalance of the insufflation gas going in and out of the sealed rectum. Billowing is observed during the surgical procedure and a surgeon can learn how to deal with such a situation using the model according to the present invention. During billowing, a surgeon continues to perform the procedure including such dynamic changes occurring within the lumen diameter due to the changes in pressure. Billowing can be simulated with the use of the model of the present invention by simulating a leak. The leak is simulated by opening a luer port on the cap access port. Advantageously, the model of the present invention is capable of creating such a training situation that is observed during a real surgical procedure while using insufflation. This training opportunity is not provided by a standard silicone model. As mentioned previously, the ability to use energy devices on a training model described in is another advantage over silicone models. The use of energy devices provides a more realistic training for the procedure as the trainee would need to be aware of the instrument's capabilities and handle the simulated tissue appropriately. The use of energy devices exposes the trainee to smoke and char build-up within the lumen and on the instrument that typically occurs during an actual TAMIS procedure. The hydrogel material of the present invention is capable of being cut with electrosurgical instruments and advantageously creates a smoke plume that accumulates inside the lumen of the model. Additionally, the residue from the hydrogel material builds-up on the energy device simulates char build-up when cutting tissue using energy instruments. Solutions such as saline can be used within the simulated model in order to keep the model moist and prevent excess char build-up on the instruments when using the simulated model. Although, the use of non-energy-based laparoscopic scissors or dissectors on the silicone-based TAMIS training models allow for teaching the motions of the procedure, they do not appropriately train tissue handling with use of real electrosurgical energy devices. Other limitations of silicone models include the lack of appropriate presentation of layers on the model as well as the lack of haptic feedback of the dissection incurred using electrosurgical devices during the procedure during polyp removal. Some silicone-based models only have multi-layered polyp regions which are not an accurate representation of the anatomy. The anatomy of the rectum contains multiple layers for the rectal mucosa, muscles, and mesorectum throughout its length. Thus, when cutting outside the polyp region within a standard silicone model, the trainee is presented with an incorrect anatomy and, hence, a training gap with respect to the understanding the anatomy in which the procedure occurs. To resolve this training gap with the simulated model described in this invention, the layers of the rectum are simulated by preparing and molding all three layers (rectal mucosa, muscle, and mesorectum) lengthwise. The polyp layers in a silicone-based model include a thin pink layer to simulate the rectum mucosa followed by a thin yellow layer to simulate the mesorectum which are selectively adhered at specific location to allow for the separation between these two layers to occur. The limitation of such a model is that it does not capture all the layers found anatomically. Additionally, the layer thicknesses within the silicone models do not capture the varying thicknesses of the layers found anatomically. A solution to this limitation is solved by the hydrogel TAMIS model described in this invention wherein all three layers can be found and each layer has a thickness that closely represents the thickness of the walls of each layer found anatomically. Additionally, the model of the present invention has a varying thickness such that the mucosal and muscle layers closely match the thickness of the anatomy. Furthermore, the simulated mesorectum layer in the hydrogel TAMIS model is thick enough to maintain insufflation but does not directly mimic the thickness of the anatomy which varies lengthwise. The hydrogel model of the present invention further simplifies the manufacturing process since a constant thickness for the mesorectum layer can be used. This anatomical departure found in the model of the present invention does not have a pedagogical effect on the training model as the trainee would not be excising a polyp beyond the muscle layer for a TAMIS procedure. Excising the mesorectum layer would be a part of a Total Mesorectum Excision (TME) procedure which is a different surgical procedure than a TAMIS procedure. The adherence of the silicone model layers described above advantageously allows the layers of the polyps to be separated using laparoscopic instruments such as scissors and graspers; however, the training on a silicone-based model is limited by its ability because energy instruments are not capable of being used with a silicone model. In the TAMIS model described in this invention, the layers are fused together and the energy devices separate the fusion by cutting between the colored planes that distinguishes the simulated anatomical layers. The model of the present invention advantageously permits a partial thickness polyp removal having a dissection pathway approximately between the mucosal layer and the muscle layer. The dissection pathway is advantageously indicated by the different color of the layers and the ease of separation at the intersection of the two layers arising from the preselected material formulations for the layers and their separation effect described in detail above. Also, the model of the present invention advantageously permits a full thickness polyp removal having a dissection pathway approximately between the muscle layer and the mesorectum layer. The dissection pathway is advantageously indicated by the different color of the layers and the ease of separation at the intersection of the two layers arising from the preselected material formulations for the layers and their ease of separation described in detail above.

It is understood that various modifications may be made to the embodiments of the synthetic tissue disclosed herein. Therefore, the above description should not be construed as limiting, but merely as exemplifications of preferred embodiments. Those skilled in the art will envision other modifications within the spirit and scope of the present disclosure.

We claim:

1. A simulated rectum model for use with electrosurgical devices, comprising:
 a cylindrical tube comprising three layers and defining a central lumen having a proximal opening at a proximal end and a distal opening at a distal end; wherein the three layers include:
 a first layer made of an electrically conductive hydrogel comprising a dual interpenetrated cross-linked network having a first ratio of a covalently cross-linked acrylamide to an ionically cross-linked alginate;
 a second layer of an electrically conductive hydrogel comprising a dual interpenetrated cross-linked network having a second ratio of a covalently cross-linked acrylamide to an ionically cross-linked alginate; and
 a third layer of an electrically conductive hydrogel comprising a dual interpenetrated cross-linked network having a third ratio of a covalently cross-linked acrylamide to an ionically cross-linked alginate;

wherein the first layer includes an inner surface defining the central lumen having a longitudinal axis and the third layer defines an outer surface of the cylindrical tube with the second layer located between the first layer and the third layer.

2. The simulated rectum model of claim 1 wherein the first layer includes at least one simulated polyp molded with the first layer and extending inwardly toward the longitudinal axis.

3. The simulated rectum model of claim 1 wherein the first ratio is 8:1 or 8:3, the second ratio is 8:1 or 8:3 and the third ratio is 8:1 or 8:3.

4. The simulated rectum model of claim 3 wherein the first, second and third ratios are the same.

5. The simulated rectum model of claim 1 wherein the first and second ratios are both 8:1.

6. The simulated rectum model of claim 1 wherein the second and third ratios are both 8:1.

7. The simulated rectum model of claim 1 wherein the inner surface includes at least one at least partially circumferential transverse fold molded with the first layer and extending inwardly toward the central lumen.

8. The simulated rectum model of claim 1 wherein the proximal opening is sealed with an access cap, the distal opening is closed and the cylindrical tube is configured to expand upon delivery of insufflation gas into the central lumen across a port in the access cap.

9. The simulated rectum model of claim 1 wherein one of the second layer or third layer is molded onto the other of the second layer or third layer to form a separable boundary of adhesion.

10. The simulated rectum model of claim 1 wherein one of the first layer and second layer is molded onto the other of the first layer or second layer to form a separable boundary of adhesion.

11. The simulated rectum model of claim 1 wherein the cylindrical tube is dissectible with electrosurgical instruments.

12. A method of making a simulated rectum model comprising the steps of:
providing an uncured first hydrogel;
providing an uncured second hydrogel;
providing an uncured third hydrogel;
sequentially curing the first hydrogel, second hydrogel and third hydrogel to form a tubular structure having a first layer comprising the first hydrogel, a second layer comprising the second hydrogel and a third layer comprising the third hydrogel; the tubular structure having an outer surface and an inner surface defining an inner lumen.

13. The method of claim 12 further including the steps of:
providing a first mold;
providing a second mold;
placing the first mold inside the second mold and defining a first gap therebetween;
pouring the uncured first hydrogel into the first gap;
wherein the step of sequentially curing includes the step of curing the first hydrogel to form the first layer.

14. The method of claim 12 wherein the step of sequentially curing includes the step of curing the second hydrogel onto the cured first hydrogel to form the second layer; the second layer being bonded to the first layer when cured.

15. The method of claim 13 further including the steps of:
providing a third mold;
placing the first layer inside the third mold and defining a second gap therebetween;
pouring the uncured second hydrogel into the second gap;
wherein the step of sequentially curing includes the step of curing the second hydrogel to form the second layer.

16. The method of claim 14 wherein the step of sequentially curing includes the step of curing the third hydrogel onto the cured second hydrogel to form a third layer; the third layer being bonded to the second layer when cured.

17. The method of claim 15 further including the steps of:
providing a fourth mold;
placing the first and second layer inside the fourth mold and defining a third gap therebetween;
pouring the uncured third hydrogel into the third gap;
wherein the step of sequentially curing includes the step of curing the third hydrogel to form the third layer.

18. The method of claim 12 further including the step of forming transverse folds and artificial polyps in the inner surface.

19. The method of claim 12 further including adding water to the model.

20. The method of claim 17 further including the step of removing at least one of the first mold, second mold, third mold, and fourth mold.

* * * * *